US010543843B2

(12) United States Patent
Miwa et al.

(10) Patent No.: US 10,543,843 B2
(45) Date of Patent: Jan. 28, 2020

(54) WORK VEHICLE

(71) Applicant: YANMAR CO., LTD., Osaka-shi, Osaka (JP)

(72) Inventors: Toshiyuki Miwa, Osaka (JP); Kouhei Ogura, Osaka (JP)

(73) Assignee: YANMAR CO., LTD., Osaka (JP)

( * ) Notice: Subject to any disclaimer, the term of this patent is extended or adjusted under 35 U.S.C. 154(b) by 358 days.

(21) Appl. No.: 15/518,999

(22) PCT Filed: Oct. 15, 2015

(86) PCT No.: PCT/JP2015/079136
§ 371 (c)(1),
(2) Date: Apr. 13, 2017

(87) PCT Pub. No.: WO2016/060193
PCT Pub. Date: Apr. 21, 2016

(65) Prior Publication Data
US 2017/0240175 A1 Aug. 24, 2017

(30) Foreign Application Priority Data

Oct. 16, 2014 (JP) ................................ 2014-212138
Oct. 16, 2014 (JP) ................................ 2014-212139
(Continued)

(51) Int. Cl.
B60W 30/182 (2012.01)
B60K 20/00 (2006.01)
(Continued)

(52) U.S. Cl.
CPC .......... B60W 30/182 (2013.01); B60K 20/00 (2013.01); B60K 20/04 (2013.01); B60K 20/08 (2013.01);
(Continued)

(58) Field of Classification Search
CPC .......... B60W 30/182; B60W 2300/15; B60W 2300/17; B60W 2300/152; B60W 2540/12; B60W 2540/14; B60W 2540/16
See application file for complete search history.

(56) References Cited

U.S. PATENT DOCUMENTS 8,626,407 B2    1/2014 Fujimoto
9,073,534 B2 *  7/2015 Okada ................. B60W 30/182
(Continued)

FOREIGN PATENT DOCUMENTS

CN    102897035 A    1/2013
CN    103402845 A    11/2013
(Continued)

OTHER PUBLICATIONS

Japanese Office Action dated Oct. 17, 2017 issued in corresponding JP Application 2014-212138 cites the patent document above.
(Continued)

Primary Examiner — Sherry L Estremsky
(74) Attorney, Agent, or Firm — Norton Rose Fulbright US LLP

(57) ABSTRACT

This work vehicle (tractor), which is provided with an engine and an accelerator pedal capable of changing the operational state of the engine, and is configured to be free to travel by means of an operation of the accelerator pedal by an operator, is equipped with a display near an operator's seat, said display being configured to be capable of displaying a screen (travel customization screen) for selecting whether or not to allow travel in conjunction with the accelerator.

20 Claims, 31 Drawing Sheets

(30) Foreign Application Priority Data

Oct. 24, 2014 (JP) ................................ 2014-217860
Oct. 27, 2014 (JP) ................................ 2014-218754

(51) Int. Cl.
*B60K 20/04* (2006.01)
*B60K 35/00* (2006.01)
*F16H 59/04* (2006.01)
*F16H 61/02* (2006.01)
*B60K 20/08* (2006.01)
*B60W 50/10* (2012.01)
*F16H 61/40* (2010.01)

(52) U.S. Cl.
CPC ............. *B60K 35/00* (2013.01); *B60W 50/10* (2013.01); *F16H 59/04* (2013.01); *F16H 61/02* (2013.01); *F16H 61/40* (2013.01); *B60K 2370/1438* (2019.05); *B60K 2370/15* (2019.05); *B60W 2300/152* (2013.01); *B60W 2540/10* (2013.01); *B60W 2540/12* (2013.01); *B60W 2540/14* (2013.01); *B60W 2540/16* (2013.01); *B60W 2720/10* (2013.01); *B60W 2720/106* (2013.01)

(56) References Cited

U.S. PATENT DOCUMENTS

| | | | |
|---|---|---|---|
| 9,079,586 B2* | 7/2015 | Crombez | B60W 30/182 |
| 9,151,262 B2 | 10/2015 | Fujimoto | |
| 9,155,239 B2 | 10/2015 | Hatanaka et al. | |
| 9,365,218 B2* | 6/2016 | Pallett | B60W 50/082 |
| 10,137,897 B2* | 11/2018 | Higgins | B60W 30/182 |
| 2013/0030660 A1 | 1/2013 | Fujimoto | |
| 2014/0121952 A1 | 5/2014 | Fujimoto | |
| 2015/0041228 A1 | 2/2015 | Hatanaka et al. | |
| 2017/0021830 A1* | 1/2017 | Feldman | B60W 30/14 |
| 2019/0118830 A1* | 4/2019 | Kwon | B60W 50/10 |

FOREIGN PATENT DOCUMENTS

| | | | |
|---|---|---|---|
| CN | 103764471 A | 4/2014 | |
| EP | 2752346 A1 | 7/2014 | |
| JP | H10114235 A | 5/1998 | |
| JP | 2002-295528 A | 10/2002 | |
| JP | 2003-172379 A | 6/2003 | |
| JP | 2003-185006 A | 7/2003 | |
| JP | 2004114783 A | 4/2004 | |
| JP | 2006-248385 A | 9/2006 | |
| JP | 2007-092950 A | 4/2007 | |
| JP | 2007-187288 | * | 7/2007 |
| JP | 2007187288 A | 7/2007 | |
| JP | 4439183 B2 | 3/2010 | |
| JP | 2010-071469 A | 4/2010 | |
| JP | 2010-203301 A | 9/2010 | |
| JP | 2011-245948 A | 12/2011 | |
| JP | 2013-007470 A | 1/2013 | |
| JP | 2013030002 A | 2/2013 | |
| JP | 2013049328 A | 3/2013 | |
| JP | 2013-068289 A | 4/2013 | |
| JP | 2013183709 A | 9/2013 | |
| JP | 2013-244950 A | 12/2013 | |
| JP | 2014147347 A | 8/2014 | |

OTHER PUBLICATIONS

Japanese Office Action dated Jan. 9, 2018 issued in corresponding JP Application 2014-217860 cites the patent document above.
Japanese Office Action dated Jan. 9, 2018 issued in corresponding JP Application 2014-218754 cites the patent document above.
Japanese Office Action dated Jun. 19, 2018 issued in corresponding JP Application 2014-218754 cites the patent document above.
Chinese Office Action dated Oct. 23, 2018 issued in corresponding CN Application 201580056429.5 cites the patent document above.
Korean Office Action dated May 1, 2018 issued in corresponding KR Application 10-2017-7013052 cites the patent document above.
Notification of Reasons for Refusal for corresponding JP Application No. 2014-212139; dated Jan. 9, 2018.
Extended European Search Report for corresponding Application No. 15850289.8-1710/3208131 PCT/JP2015079136; dated Oct. 11, 2017.
International Search Report corresponding to Application No. PCT/JP2015/079136; dated Jan. 12, 2016.

* cited by examiner

WORK VEHICLE

TECHNICAL FIELD

The present invention relates to a work vehicle.

BACKGROUND ART

Tractors have conventionally been known as a typical work vehicle (see Patent Literature 1). The tractors can travel with an operator operating an accelerator pedal. The tractors can also travel with the operator operating a shift lever and the like. Thus, the tractors travel under an operation suitable for each situation.

When the accelerator pedal and the shift lever or the like are simultaneously operated in the tractor, a traveling state largely changes. Thus, some tractors that have been proposed feature traveling based on an operation on the accelerator pedal (hereinafter, referred to as "accelerator interlocked traveling") that is selected to be allowed or not. Unfortunately, such a selecting operation may be difficult to understand by an operator and thus might be difficult.

When the tractor that has been stopped starts traveling, what is known as shift shock occurs. The shift shock also occurs when the traveling speed changes due to the driving force generated excessively sensitively in response to an operation of the operator.

Tractors include a continuously variable transmission. Starting and traveling speed can be changed by changing an operation state of the continuously variable transmission. All things considered, there has been a demand for a technique of achieving a drive feeling suitable for the operator with the response speed of the continuously variable transmission being adjustable to prevent the shift shock. However, an operation of adjusting the acceleration characteristics might be difficult because the operator cannot clearly recognize the change as a result of the adjustment.

A technique has been disclosed in which speed is shifted based on an HST gear ratio control curve when a braking operation is performed with a brake operation unit (see Patent Literature 2).

In a tractor, speed of which can be shifted with a hydraulic continuously variable transmission, a frictional main clutch is not included, and power is transmitted from an engine to the transmission by using a damper. In this configuration, half clutch cannot be achieved by operating a clutch pedal, and thus the traveling speed cannot be adjusted in detail. It might be easier for an operator who is used to operating a manual transmission of an automobile to adjust the vehicle speed in detail with the half clutch than with a brake pedal.

CITATION LIST

Patent Literature

PTL 1: Japanese Unexamined Patent Application Publication No. 2013-183709
PTL 2: Japanese Patent No. 4439183

SUMMARY OF INVENTION

Technical Problem

An object of the present invention is to provide a work vehicle in which an operator can select whether to allow accelerator interlocked traveling while watching a screen and thus can easily perform the selection operation. Another object of the present invention is to provide a work vehicle that can achieve a drive feeling suitable for the operator. Still another object of the present invention is to provide a work vehicle in which the operator can adjust an acceleration characteristic while watching a screen and thus can easily perform this operation. Yet still another object of the present invention is to provide a work vehicle in which a speed adjustment can be performed with a brake pedal or a clutch pedal as in a case of half clutch, with braking, a transmission, and a main clutch controlled in accordance with an operation speed of the brake pedal and the clutch pedal in such a manner that a load on the engine is reduced as much as possible.

Solution to Problem

A first aspect of the present invention provides a work vehicle including:
  an engine;
  a continuously variable transmission configured to convert rotational driving force from the engine, the continuously variable transmission having an operation state changeable for changing a speed of the work vehicle starting and travelling; and
  an operation control device,
  wherein an acceleration characteristic is adjustable for a case where the work vehicle starts or a traveling speed is changed by operating the operation control device.

A second aspect of the present invention is that, in the work vehicle according to the first aspect,
  the operation control device may include a brake operation device, and
  the acceleration characteristic may be adjustable for a case where the work vehicle is started by operating the brake operation device.

A third aspect of the present invention is that, in the work vehicle according to the first aspect,
  the operation control device may include a clutch operation device, and
  the acceleration characteristic may be adjustable for a case where the work vehicle is started by operating the clutch operation device.

A fourth aspect of the present invention is that, in the work vehicle according to the first aspect,
  the operation control device may include a forward-backward traveling switching operation device, and
  the acceleration characteristic may be adjustable for a case where the work vehicle is started by operating the forward-backward traveling switching operation device.

A fifth aspect of the present invention is that, in the work vehicle according to the first aspect,
  the operation control device may include a shift operation device, and
  the acceleration characteristic may be adjustable for a case where the work vehicle is started by operating the shift operation device.

A sixth aspect of the present invention is that, in the work vehicle according to the first aspect,
  the operation control device may include a shift operation device, and
  an acceleration characteristic may be adjustable for a case where the traveling speed is changed by operating the shift operation device.

A seventh aspect of the present invention is that, the work vehicle according to any one of the first to sixth aspects may further include a display disposed near an operator's seat, and the display may be capable of displaying a screen for adjusting the acceleration characteristic.

An eighth aspect of the present invention is that, in the work vehicle according to the seventh aspect, the display may be capable of displaying a screen for adjusting the acceleration characteristic for each operated position of the shift operation device.

A ninth aspect of the present invention is that, in the work vehicle according to the seventh or eighth aspect, the display may be capable of displaying a slide bar slidable toward one end side for achieving a slower acceleration characteristic and toward another end side for achieving a quicker acceleration characteristic.

A tenth aspect of the present invention is that, the work vehicle according to the first aspect may further include an accelerator pedal with which an operational state of the engine is changeable, and in the work vehicle capable of traveling with an operator operating the accelerator pedal, a display may be disposed near an operator's seat, and the display may be capable of displaying a screen for selecting whether accelerator interlocked traveling is allowed.

An eleventh aspect of the present invention is that, the work vehicle according to the tenth aspect, may further include:

a transmission; and a shift lever with which an operation state of the transmission is changeable, and the display may be capable of displaying the screen for selecting whether the accelerator interlocked traveling is allowed for each operated position of the shift lever.

A twelfth aspect of the present invention is that, in the work vehicle according to the tenth or eleventh aspect, switching for selecting not to allow the accelerator interlocked traveling may be unable to be performed on the display while the vehicle is traveling.

A thirteenth aspect of the present invention is that, the work vehicle according to the first aspect may further include:

a brake pedal with which a braking device provided to the traveling unit is operated;

a depression amount detection unit configured to detect a depression amount of the brake pedal;

a main clutch pedal with which a main clutch is operated for connecting and disconnecting power in a middle of a power transmission path between the engine and the traveling unit;

a depression amount detection unit configured to detect a depression amount of the main clutch pedal; and a controller configured to perform deceleration with the continuously variable transmission in accordance with the depression amount of the brake pedal or the main clutch pedal.

A fourteenth aspect of the present invention is that, in the work vehicle according to the thirteenth aspect, the controller may be configured to perform, when a value detected by the depression amount detection unit for the brake pedal or the main clutch pedal exceeds a first setting value, speed change with the continuously variable transmission for achieving a vehicle speed corresponding to the depression amount, and to make the work vehicle travel at a creeping speed when the value is larger than a second setting value and smaller than a value at a maximum depression position.

A fifteenth aspect of the present invention is that, in the work vehicle according to the thirteenth aspect, the controller may be configured to prioritize, when the accelerator pedal and the accelerator lever are both operated, the operation on the brake pedal.

Advantageous Effects of Invention

The present application provides the following advantageous effects.

According to the first aspect of the present invention, the present work vehicle includes the operation control device. In the present work vehicle, the acceleration characteristic is adjustable for a case where the work vehicle starts or a traveling speed is changed by operating the operation control device. Thus, the work vehicle can achieve a drive feeling suitable for the operator.

According to the second aspect of the present invention, the present work vehicle includes the brake operation device as the operation control device. Thus, the acceleration characteristic is adjustable for a case where the work vehicle is started by operating the brake operation device. Thus, the work vehicle can achieve a drive feeling suitable for the operator.

According to the third aspect of the present invention, the present work vehicle includes the clutch operation device as the operation control device. The acceleration characteristic is adjustable for a case where the work vehicle is started by operating the clutch operation device. Thus, the work vehicle can achieve a drive feeling suitable for the operator.

According to the fourth aspect of the present invention, the present work vehicle includes the forward-backward traveling switching operation device as the operation control device. The acceleration characteristic is adjustable for a case where the work vehicle is started by operating the forward-backward traveling switching operation device. Thus, the work vehicle can achieve a drive feeling suitable for the operator.

According to the fifth aspect of the present invention, the present work vehicle includes the shift operation device as the operation control device. The acceleration characteristic is adjustable for a case where the work vehicle is started by operating the shift operation device. Thus, the work vehicle can achieve a drive feeling suitable for the operator.

According to the sixth aspect of the present invention, the present work vehicle includes the shift operation device as the operation control device. The acceleration characteristic is adjustable for a case where the traveling speed of the work vehicle is changed by operating the shift operation device. Thus, the work vehicle can achieve a drive feeling suitable for the operator.

According to the seventh aspect of the present invention, the present work vehicle includes the display disposed near the operator's seat. The display is capable of displaying a screen for adjusting the acceleration characteristic. Thus, in the work vehicle, the operator can adjust the acceleration characteristic while watching the screen, and thus can easily perform this operation.

According to the eighth aspect of the present invention, the display is capable of displaying a screen for adjusting the acceleration characteristic for each operated position of the shift operation device. Thus, in the work vehicle, the acceleration characteristic can be changed for each operated position of the shift lever.

According to the ninth aspect of the present invention, the display is capable of displaying a slide bar slidable toward one end side for achieving a slower acceleration characteristic and toward another end side for achieving a quicker acceleration characteristic. Thus, the change in the work vehicle as a result of the adjustment can be easily recognized.

According to the tenth aspect of the present invention, in the present work vehicle, a display is disposed near an operator's seat. The display is capable of displaying a screen for selecting whether accelerator interlocked traveling is allowed. Thus, in the work vehicle, the operator can select whether the accelerator interlocked traveling is allowed while watching the screen, and thus can easily perform this operation.

According to the eleventh aspect of the present invention, the present work vehicle includes: a transmission; and a shift lever with which an operation state of the transmission is changeable. The display is capable of displaying the screen for selecting whether the accelerator interlocked traveling is allowed for each operated position of the shift lever. Thus, in the present work vehicle, whether the accelerator interlocked traveling is allowed can be selected for each operated position of the shift lever.

According to the twelfth aspect of the present invention, switching for selecting not to allow the accelerator interlocked traveling is not able to be performed on the display while the vehicle is traveling. Thus, the traveling state of the work vehicle can be prevented from largely changing.

According to the thirteenth to fifteenth aspects of the present invention, the speed control can be performed as in the case of a half clutch. Specifically, an operator who is used to an automatic transmission of an automobile can use the brake pedal, and an operator who is used to a manual transmission can use the clutch pedal to perform the speed control as in the case of the half clutch. All things considered, the speed can be easily adjusted in detail with a simple configuration.

DESCRIPTION OF EMBODIMENTS

The technical concept of the present invention is applicable to any work vehicle. The present application gives a description using a tractor, which is a typical work vehicle, as an example.

First, a tractor 1 is briefly described.

Figure 1:
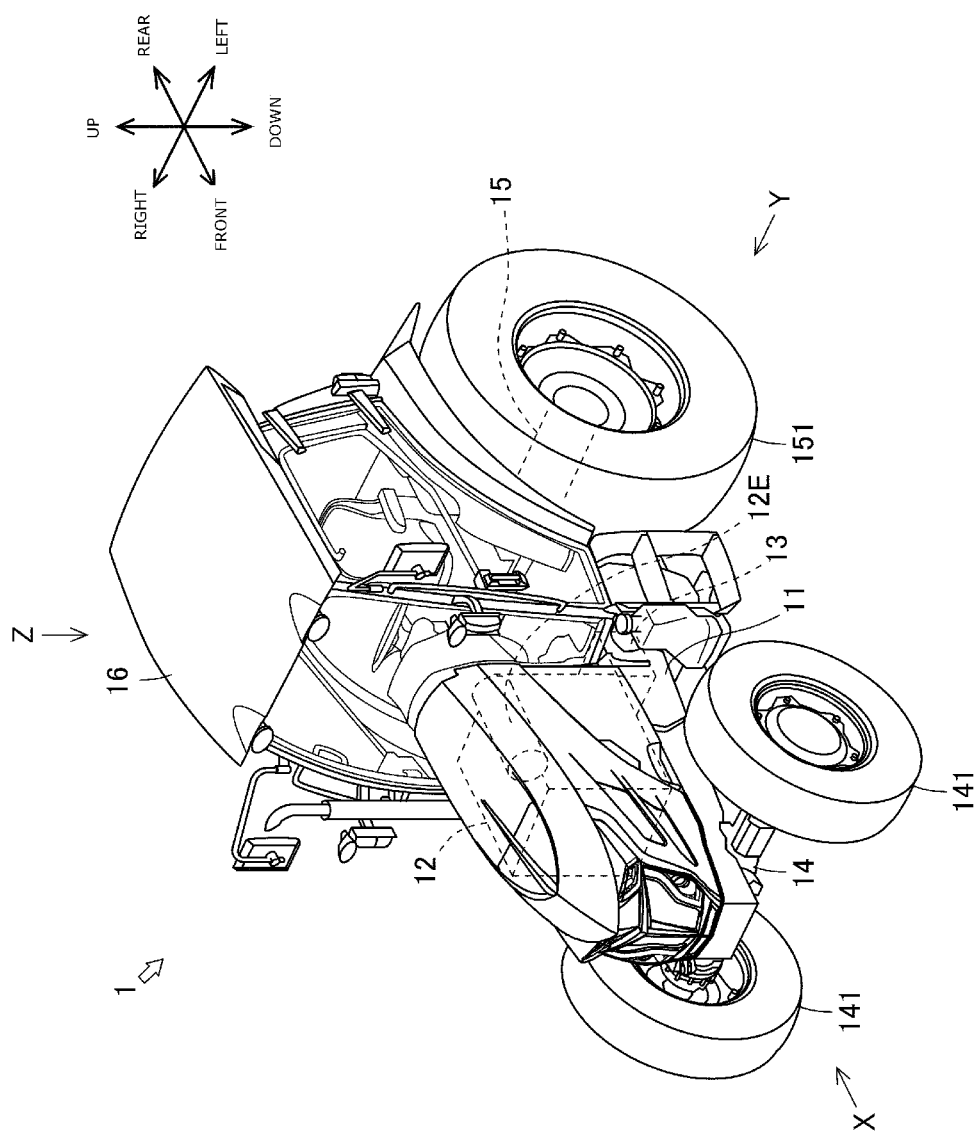
FIG. 1 is a diagram illustrating a tractor.
Figure 2:
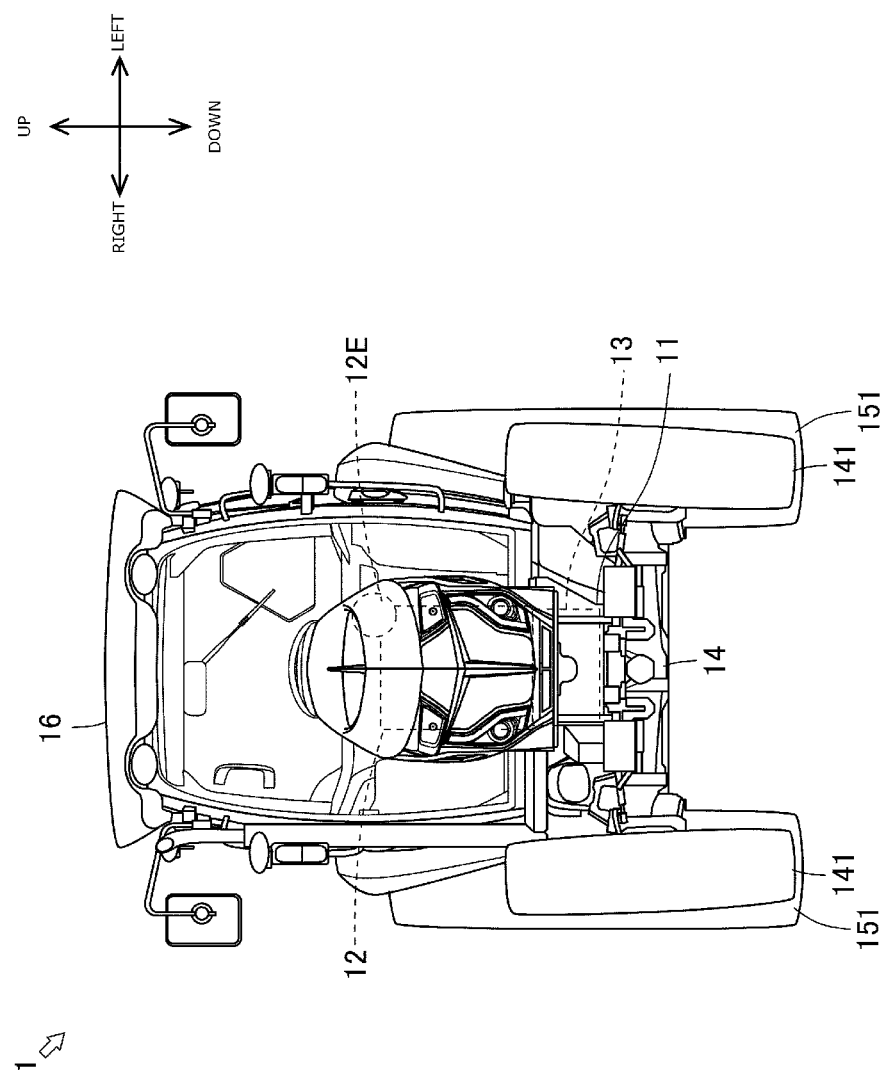
FIG. 2 is a diagram viewed in the direction of an arrow X in FIG. 1.
Figure 3:
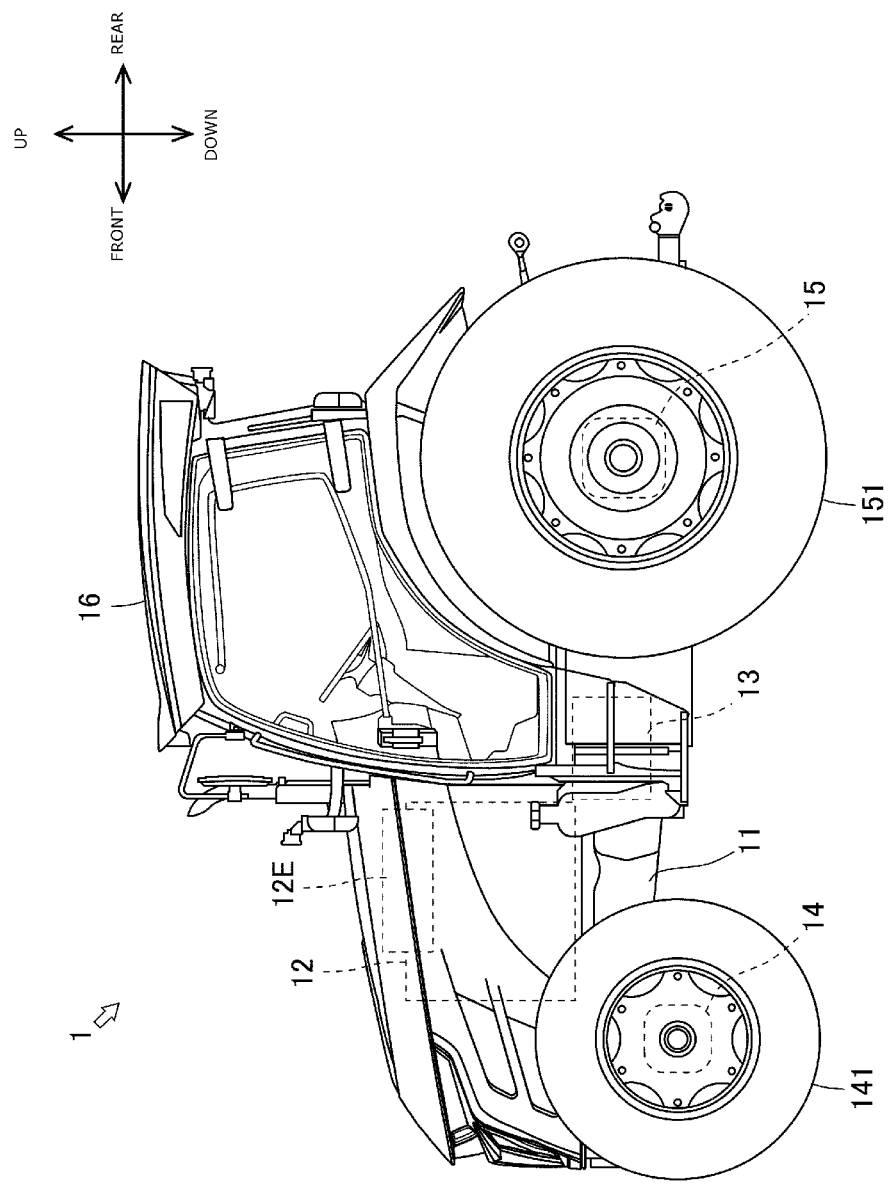
FIG. 3 is a diagram viewed in the direction of an arrow Y in FIG. 1.
Figure 4:
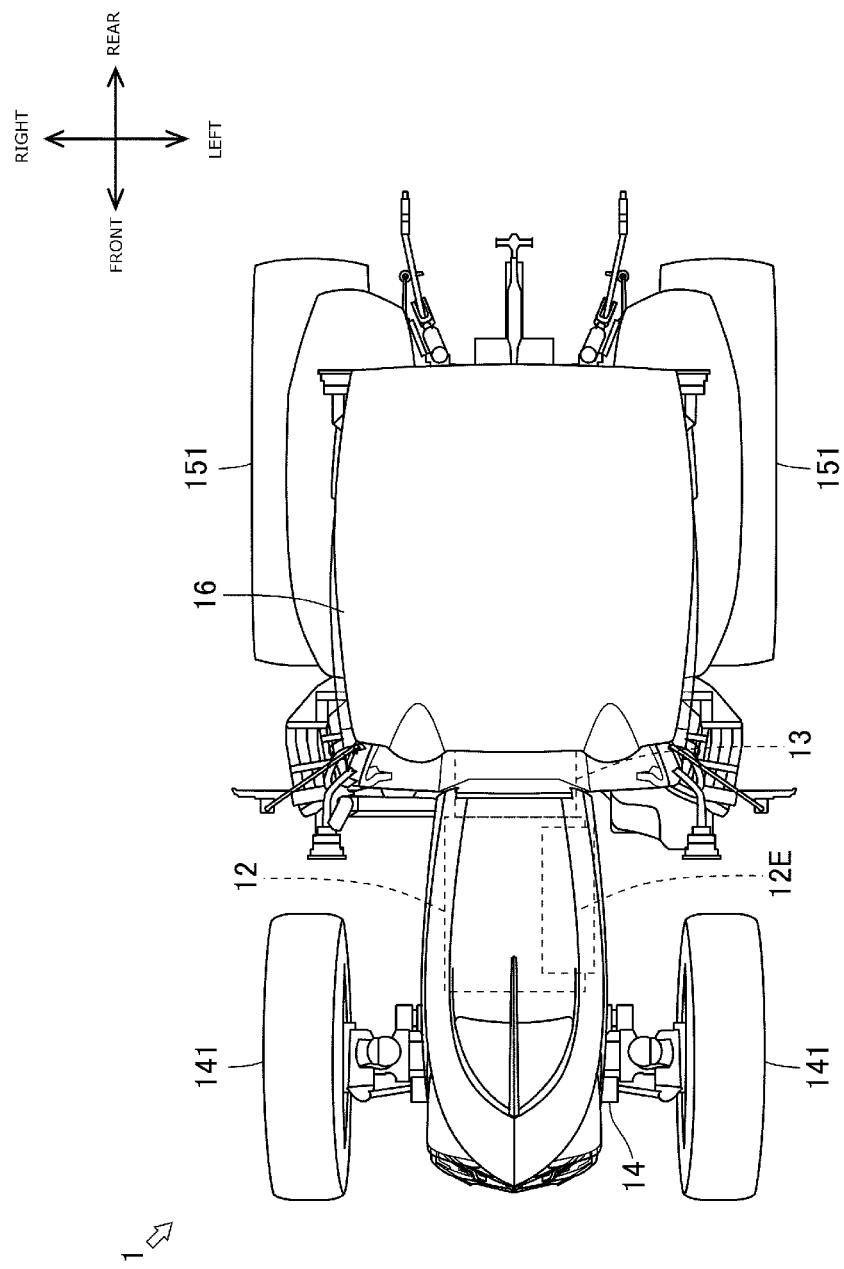
FIG. 4 is a diagram viewed in the direction of an arrow Z in FIG. 1.

FIG. 1 illustrates the tractor 1. FIG. 2 is a diagram viewed in the direction of an arrow X in FIG. 1, FIG. 3 is a diagram viewed in the direction of an arrow Y in FIG. 1, and FIG. 4 is a diagram viewed in the direction of an arrow Z in FIG. 1. In these figures, the front and rear direction, the right and left direction, and the upper and lower direction of the tractor 1 are illustrated.

The tractor 1 mainly includes a frame 11, an engine 12, a transmission 13, front axles 14, and rear axles 15. The tractor 1 further includes a cabin 16. The cabin 16 has an inner side serving as an operation control room in which an operator's seat 161, an accelerator pedal 162, a shift lever 163, and the like are arranged (see FIG. 7).

The frame 11 serves as a front frame of the tractor 1. The frame 11, the transmission 13, and the rear axle 15 form a chassis of the tractor 1. The engine 12 described below is supported by the frame 11.

The engine 12 burns fuel, and converts thermal energy thus obtained into kinetic energy. Thus, the engine 12 burns fuel to generate rotational driving force. An engine controller (not illustrated) is connected the engine 12. When an operator operates the accelerator pedal 162 (see FIG. 7), the engine controller changes an operational state of the engine 12 in accordance with the operation. The engine 12 is provided with an exhaust gas purifier 12E. The exhaust gas purifier 12E oxidizes fine particle, carbon monoxide, hydrocarbon, and the like in exhaust gas.

The transmission 13 transmits the rotational driving force from the engine 12 to the front axle 14 and the rear axle 15. The transmission 13 receives the rotational driving force from the engine 12 via a connection mechanism. The transmission 13 is provided with a continuously variable transmission 33 (see FIG. 5). When the operator operates the shift lever 163 (see FIG. 7), the continuously variable transmission 33 changes an operation state of the transmission 13 in accordance with the operation.

The front axle 14 transmits the rotational driving force from the engine 12 to front wheels 141. The front axle 14 receives the rotational driving force from the engine 12 via the transmission 13. A steering device (not illustrated) is arranged adjacent to the front axle 14. When the operator operates a steering wheel 164 (see FIG. 7), the steering device changes a steering angle of the front wheels 141 in accordance with the operation.

The rear axle 15 transmits the rotational driving force from the engine 12 to rear wheels 151. The rear axle 15 receives the rotational driving force from the engine 12 via the transmission 13. The rear axle 15 is provided with a PTO output device (not illustrated). When the operator operates a PTO switch 165 (see FIG. 7), the PTO output device transmits the rotational driving force to a work machine being pulled, in accordance with the operation.

Next, a power transmission system of the tractor 1 is described.

Figure 5:
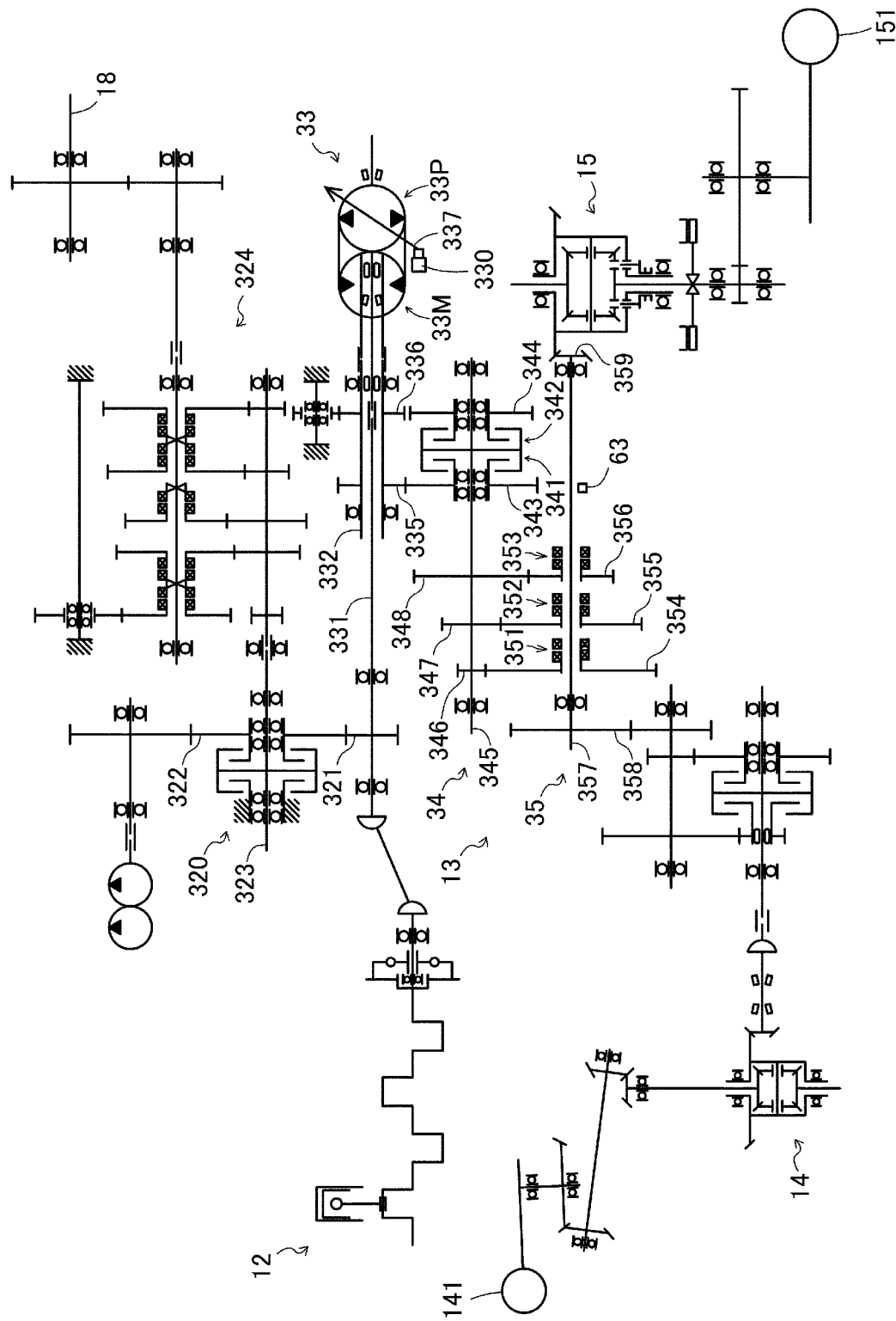
FIG. 5 is a diagram illustrating a power transmission system of the tractor.
Figure 6:
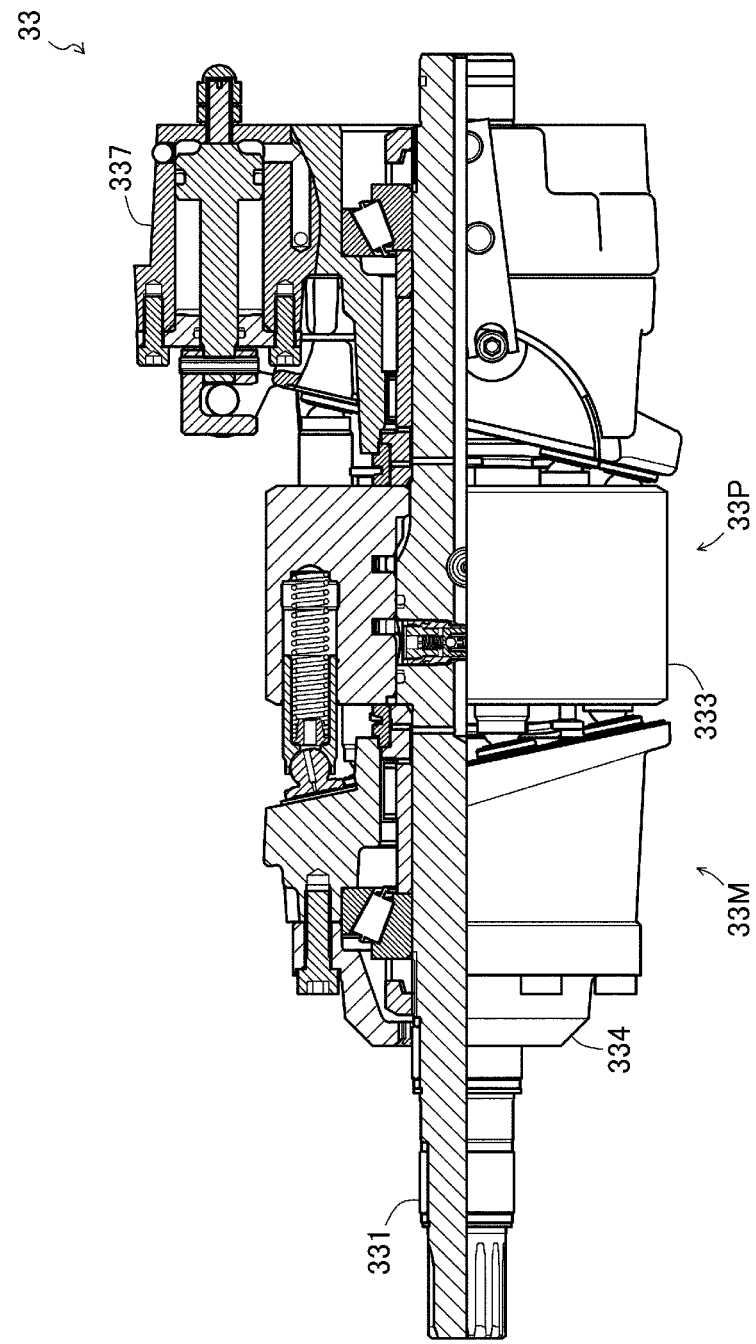
FIG. 6 is a diagram illustrating a continuously variable transmission.

FIG. 5 illustrates the power transmission system of the tractor 1. FIG. 6 illustrates the continuously variable transmission 33.

The power transmission system of the tractor 1 mainly includes the engine 12, the transmission 13, the front axle 14, and the rear axle 15. Here, the description focuses on the structure of the transmission 13.

The transmission 13 includes the continuously variable transmission 33, a forward-backward traveling switching device 34, and a sub transmission 35.

The continuously variable transmission 33 can sleeplessly change the ratio of rotation speed between an input shaft 331 and an output shaft 332. The input shaft 331 is coupled to a rotatably supported plunger block 333. The plunger block 333 sends high pressure hydraulic oil, and functions as a hydraulic pump 33P. The output shaft 332 is coupled to a rotatably supported motor case 334. The motor case 334 rotates by receiving the high pressure hydraulic oil, and thus functions as a hydraulic motor 33M. A forward driving gear 335 and a backward driving gear 336 are attached to the output shaft 332.

The forward-backward traveling switching device 34 can operate a forward traveling clutch 341 and a backward traveling clutch 342 independently from each other. The forward traveling clutch 341 includes a forward driven gear 343 that meshes with the forward driving gear 335. The forward traveling clutch 341 that is operated transmits the rotational driving force from the output shaft 332 to a center shaft 345. The backward traveling clutch 342 includes a backward driven gear 344 that meshes with the backward driving gear 336 via a reverse gear. The backward traveling clutch 342 that is operated transmits the rotational driving force from the output shaft 332 to the center shaft 345. A super-low speed driving gear 346, a first speed driving gear 347, and a second speed driving gear 348 are attached to the center shaft 345.

The sub transmission 35 can operate a super low speed clutch 351, a first speed clutch 352, and a second speed clutch 353 independently from each other. The super low speed clutch 351 includes a super slow speed driven gear 354 that meshes with the super-low speed driving gear 346. The super low speed clutch 351 being operated transmits the rotational driving force from the center shaft 345 to a countershaft 357. The first speed clutch 352 includes a first speed driven gear 355 that meshes with the first speed driving gear 347. The first speed clutch 352 being operated transmits the rotational driving force from the center shaft 345 to the countershaft 357. The second speed clutch 353 includes a second speed driven gear 356 that meshes with the second speed driving gear 348. The second speed clutch 353 being operated transmits the rotational driving force from the center shaft 345 to the countershaft 357. A front drive gear 358 and a rear drive gear 359 are attached to the countershaft 357.

With this structure, the rotational driving force from the countershaft 357 is transmitted to the front wheels 141 via the front axles 14. The rotational driving force from the countershaft 357 is transmitted to the rear wheels 151 via the rear axles 15.

The continuously variable transmission 33 can change the rotation speed of the output shaft 332, by changing the operation state. More specifically, the continuously variable transmission 33 can change the rotation speed of the output shaft 332, with a feeding amount of the hydraulic oil changed through movement of a cradle 337. When the continuously variable transmission 33 stops the rotation of the output shaft 332, the tractor 1 in a traveling state stops. When the continuously variable transmission 33 rotates the output shaft 332, the tractor 1 in a stopped state starts traveling (the tractor 1 starts to move). When the continuously variable transmission 33 changes the rotation speed of the output shaft 332, the traveling speed of the tractor 1 changes.

The continuously variable transmission 33 changes the rotation speed of the output shaft 332 when the operational state of the engine 12 changes. More specifically, the continuously variable transmission 33 changes the rotation speed of the output shaft 332 when the rotation speed of the input shaft 331 changes due to the change in the operational state of the engine 12. All things considered, the traveling speed of the tractor 1 can be freely changed by operating the accelerator pedal 162.

Next, the operation control room of the tractor 1 is described.

Figure 7:
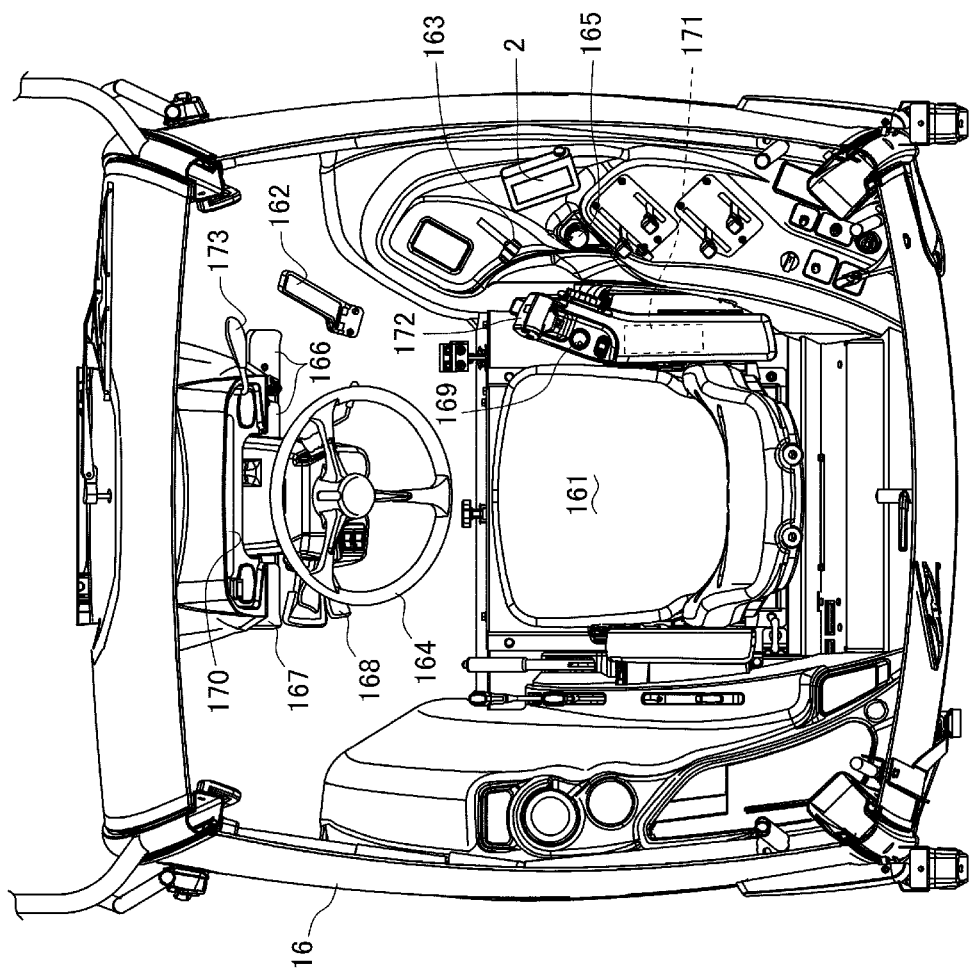
FIG. 7 is a diagram illustrating an operator's seat of the tractor and its periphery.
Figure 8:
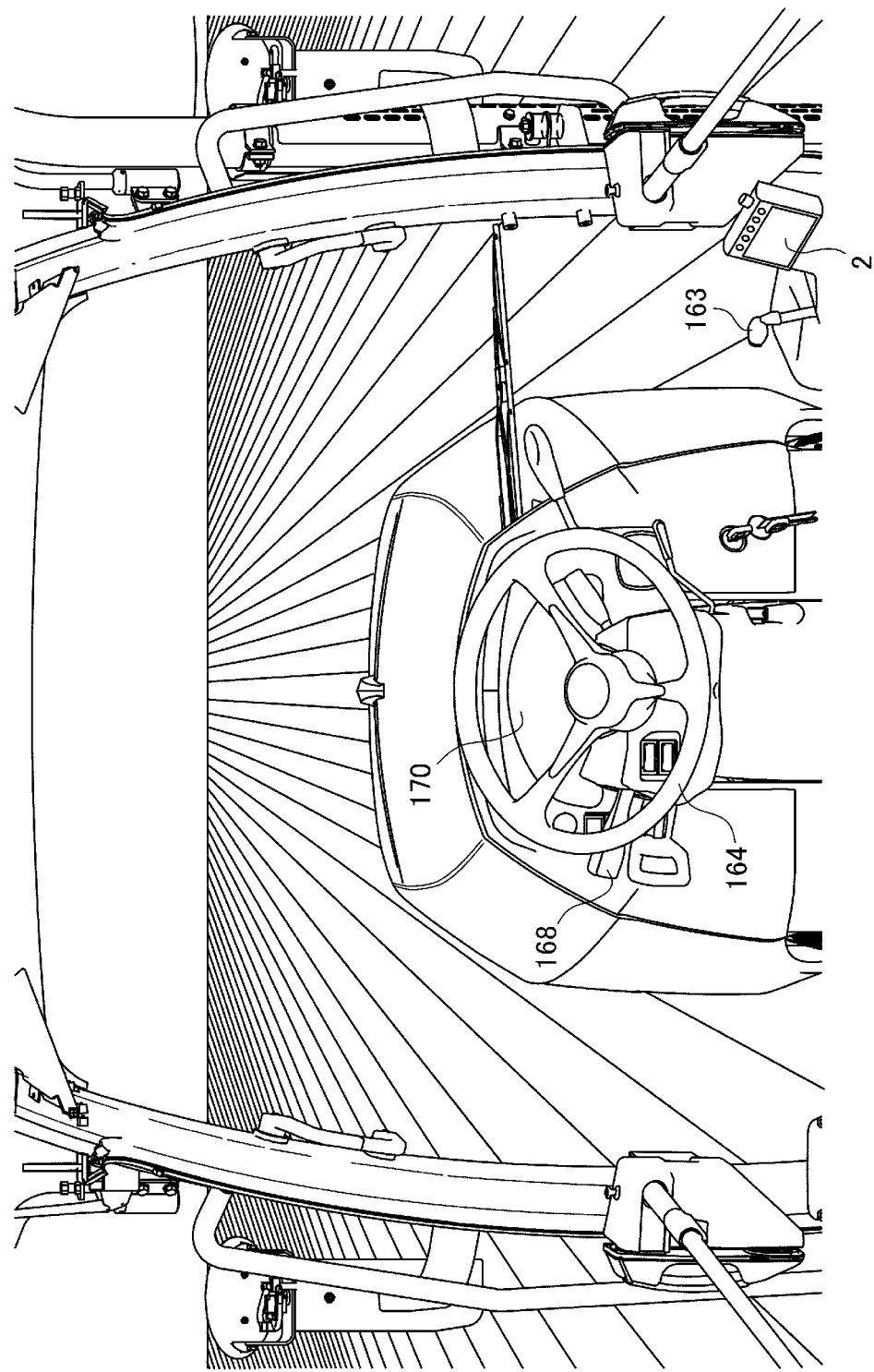
FIG. 8 is a diagram illustrating a field of view of an operator.

FIG. 7 illustrates the operator's seat 161 and its periphery. FIG. 8 illustrates a field of view of the operator.

As described above, the cabin 16 has the inner side serving as the operation control room in which the operator's seat 161, the accelerator pedal 162, the shift lever 163, and the like are arranged. A brake pedal 166, a clutch pedal 167, a reverser lever 168, a speed dial 169, an instrument panel 170, a control panel 171, and the like are arranged in the periphery of the operator's seat 161. The operator can operate the accelerator pedal 162, the shift lever 163, and the like while being seated on the operator's seat 161 to operate the tractor 1. When the operator operates the shift lever 163, the sub transmission 35 is operated. The rotational driving force is transmitted in accordance with the operated position (a position corresponding to any one of "super low speed", "first speed", and "second speed") of the shift lever 163.

The tractor 1 includes a display 2 disposed close to the operator's seat 161. The display 2 is disposed on a front right side of the operator's seat 161 so as to be operable by the right hand of the operator. Information network of the tractor 1 is briefly described below. Furthermore, the display 2 and a control system related to the display 2 are described below.

Figure 9:
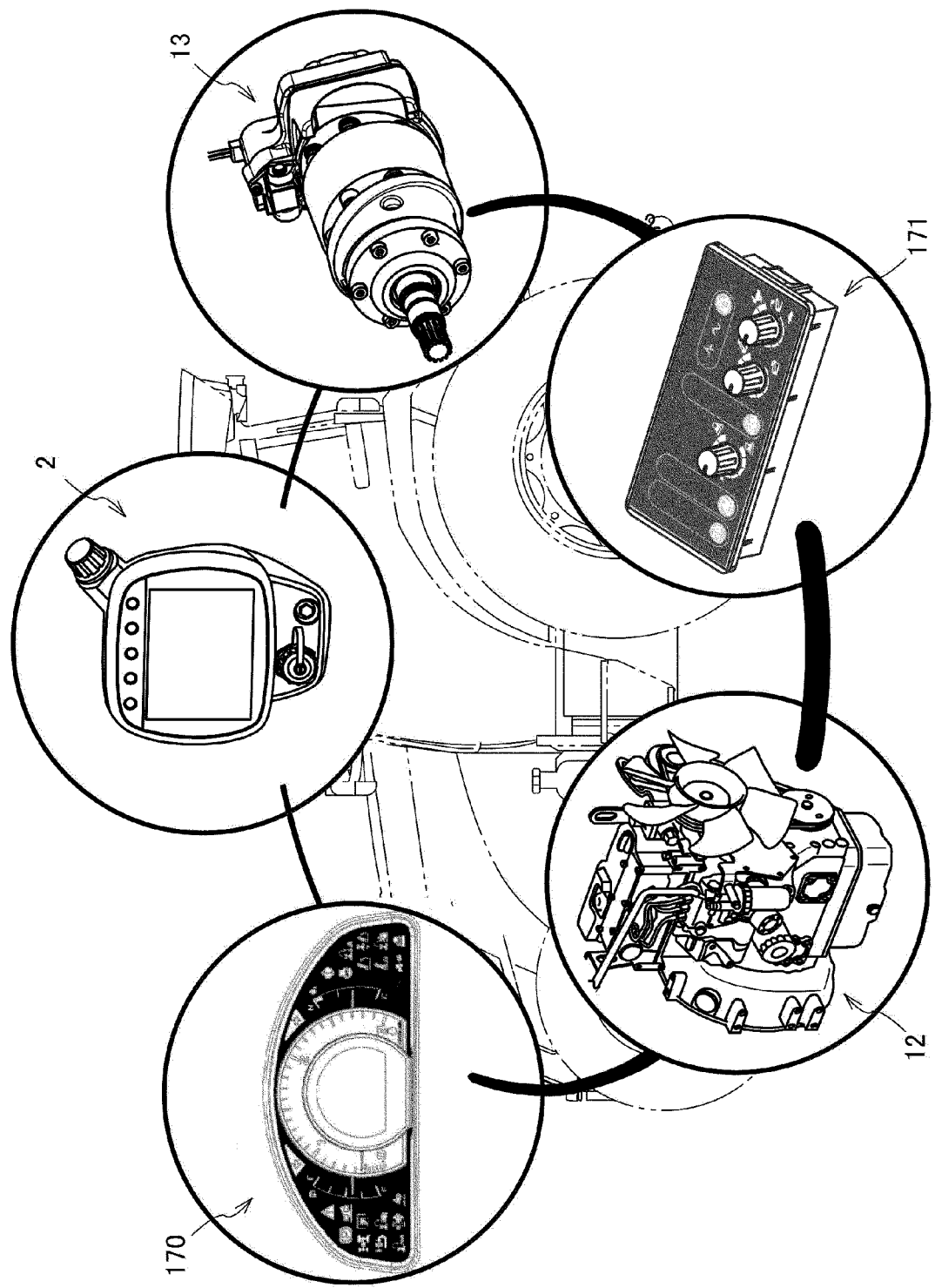
FIG. 9 is a diagram illustrating an information network of the tractor.
Figure 10:
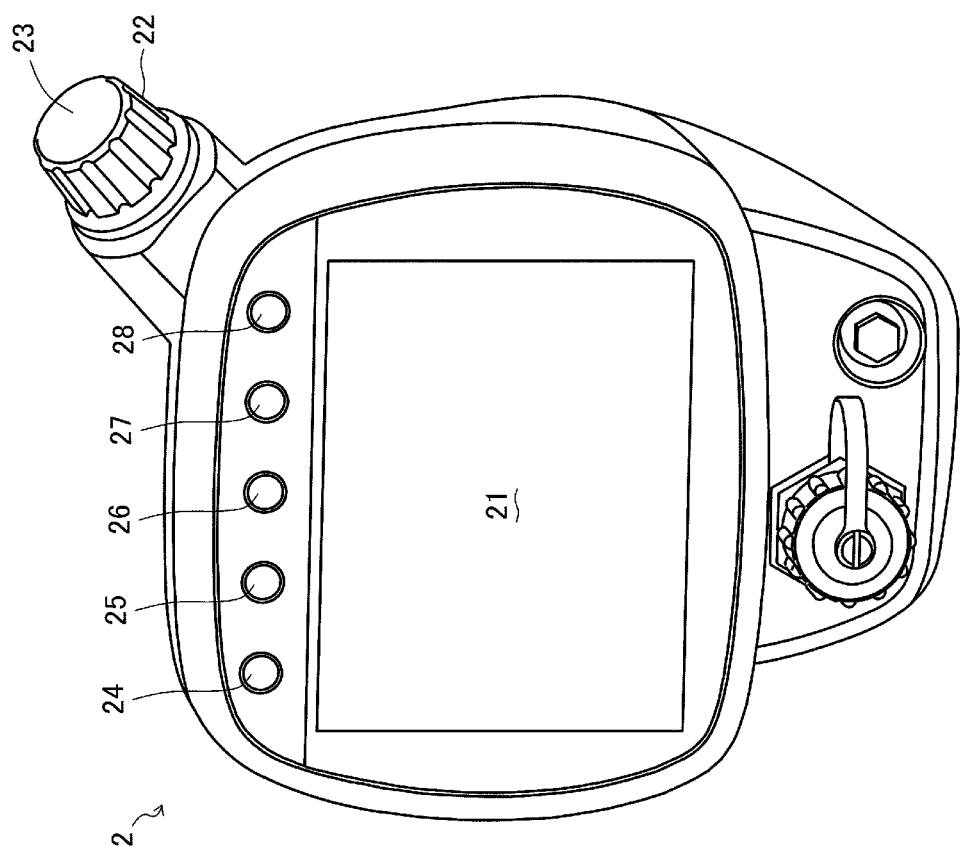
FIG. 10 is a diagram illustrating a display.
Figure 11:
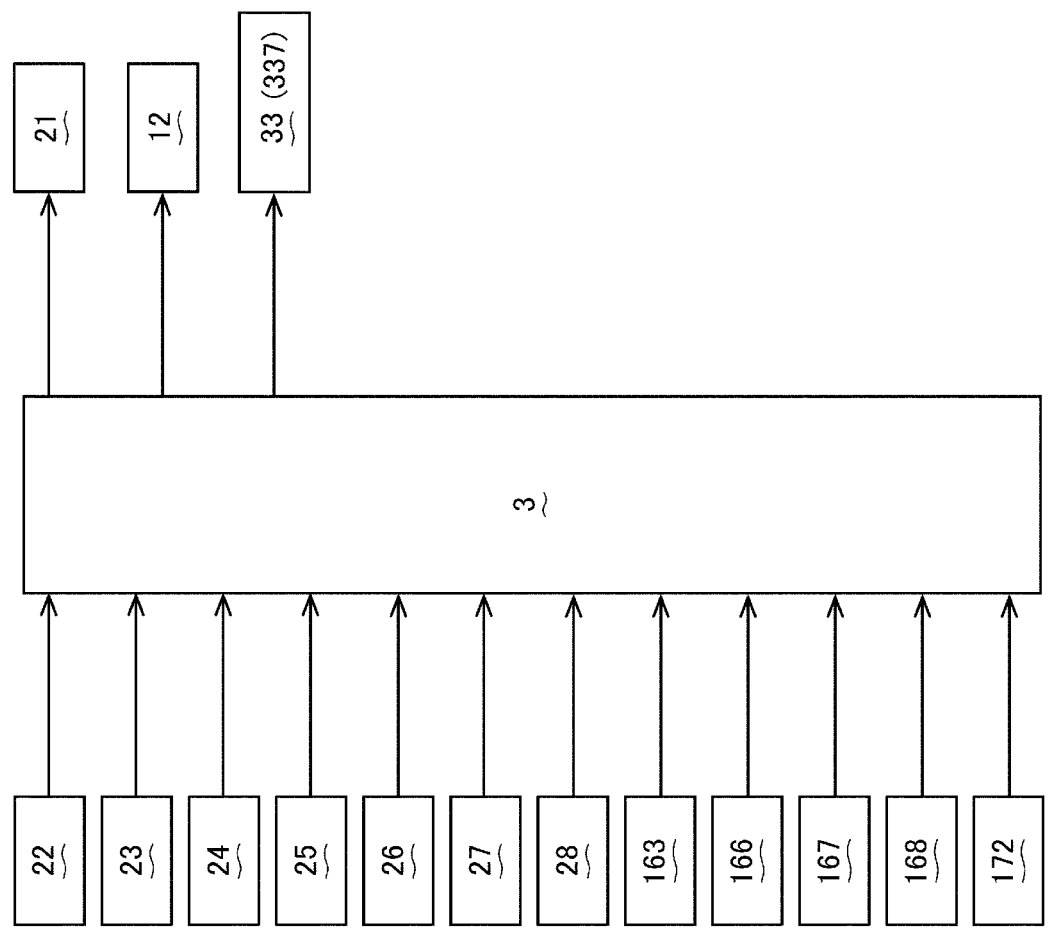
FIG. 11 is a diagram illustrating a control system related to the display.

FIG. 9 illustrates the information network of the tractor 1. FIG. 10 illustrates the display 2. FIG. 11 illustrates the control system related to the display 2.

The tractor 1 has the information network installed over various locations to achieve the maximum performance. Specifically, the transmission 13, the instrument panel 170, the control panel 171, and the display 2 form a controller area network (CAN) together with the engine 12 so that the components can share information with each other.

In the tractor 1, the display 2 is disposed on a side console (see FIGS. 7 and 8). The display 2 includes a liquid crystal panel 21, an encoder dial 22, and an enter button 23. The display 2 includes five command buttons 24, 25, 26, 27, and 28.

The liquid crystal panel 21 is provided at the center of the front surface of the display 2. The liquid crystal panel 21 can display a predetermined screen based on an instruction from a controller 3. For example, the liquid crystal panel 21 can display an opening screen S1 (see FIG. 12) based on an instruction from the controller 3. The liquid crystal panel 21 can display other screens (see FIG. 13 to FIG. 21, and FIG. 24) based on an instruction from the controller 3. The liquid crystal panel 21 may be what is known as a touch panel.

The encoder dial 22 is provided on an upper right side of the display 2. The encoder dial 22 can transmit an intension of the operator, to scroll a tab or shift a highlight, to the controller 3 for selecting an element displayed on the liquid crystal panel 21. For example, the encoder dial 22 can transmit an intension of the operator for scrolling a tab for selecting among a displayed numbers and alphabets, to the controller 3 (see FIG. 13). The encoder dial 22 can transmit an intension of the operator to shift a highlight, for selecting a displayed icon, to the controller 3 (see FIG. 14 and FIG. 15).

The enter button 23 is integrally formed with the encoder dial 22. The enter button 23 can transmits an intension of the operator to determine one of the elements displayed on the liquid crystal panel 21 to the controller 3. For example, the enter button 23 can transmit an intension of the operator to determine one of the numbers or alphabets displayed, to the controller 3 (see FIG. 13). The enter button 23 can transmit an intension of the operator to determine one of the displayed icons, to the controller 3 (see FIG. 14 and FIG. 15). The display 2 employs a configuration in which the enter button 23 is activated with the encoder dial 22 as a whole pressed in. Alternatively, a configuration in which a pressing button is provided on an upper end surface of the encoder dial 22 may be employed.

The command buttons 24, 25, and 26 are provided in an upper portion of the front surface of the display 2. When a predetermined screen is displayed on the liquid crystal display 21, the command buttons 24, 25, and 26 can transmit an intension of the operator to switch the screen to another screen to the controller 3. For example, when a home screen S3 is displayed on the liquid crystal panel 21, the command buttons 24 and 25 can transmit an intension of the operator to switch the screen to a shortcut screen (screen set by the operator as appropriate), to the controller 3 (see FIG. 14). When a customize screen S4 is displayed on the liquid crystal panel 21, the command button 26 can transmit an intension of the operator to switch the screen to the home screen S3, to the controller 3 (see FIG. 15).

The command button 27 is also provided on the upper portion of the screen of the display 2, and is, specifically, provided at a position adjacent to the command button 26. The command button 27 can transmit an intension of the operator to determine one element, as in the case of the enter button 23, to the controller 3. For example, the command button 27 can transmit an intension of the operator to determine one of the numbers or alphabets displayed, to the controller 3 (see FIG. 13). Alternatively, the command button 27 can transmit an intension of the operator to determine one of the displayed icons to the controller 3 (see FIG. 14 and FIG. 15). Furthermore, the command button 27 can transmit an intension of the operator to store the set items, to the controller 3 (see FIG. 16 and FIG. 17).

The command button 28 is also provided in the upper portion of the front surface of the display 2, and is, specifically, provided at a position adjacent to the command button 27. When a predetermined screen is displayed on the liquid crystal panel 21, the command button 28 can transmit an intension of the operator to return to a screen displayed immediately before the predetermined screen, to the controller 3. For example, when the customize screen S4 is displayed on the liquid crystal panel 21, the command button 28 can transmit an intension of the operator to return to the home screen S3, to the controller 3 (see FIG. 15). Furthermore, when a travel customization screen S5 or S6 is displayed on the liquid crystal panel 21, the command button 28 can transmit an intension of the operator to return to the customize screen S4, to the controller 3 (see FIG. 16 and FIG. 17).

Next, a method of selecting whether to allow accelerator interlocked traveling is described.

FIG. 12 to FIG. 21 and FIG. 24 illustrate a screen displayed on the display 2. It is to be noted that each figure simply illustrates only portions required for the description of the present invention.

Figure 12:
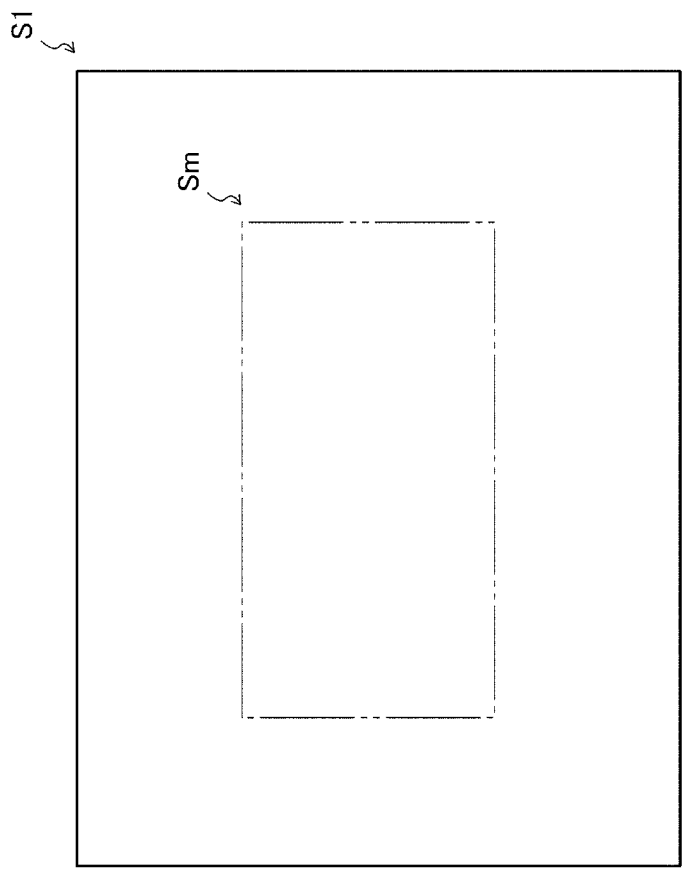
FIG. 12 is a diagram illustrating a screen displayed on the display.

First of all, the opening screen S1 is displayed on the display 2 (see FIG. 12). In the opening screen S1, a symbol mark Sm is displayed at a portion around the center. The symbol mark Sm is a design representing a supplier/manufacturer. The symbol mark Sm appears on a black back ground image, and gives strong impression to the operator.

Figure 13:
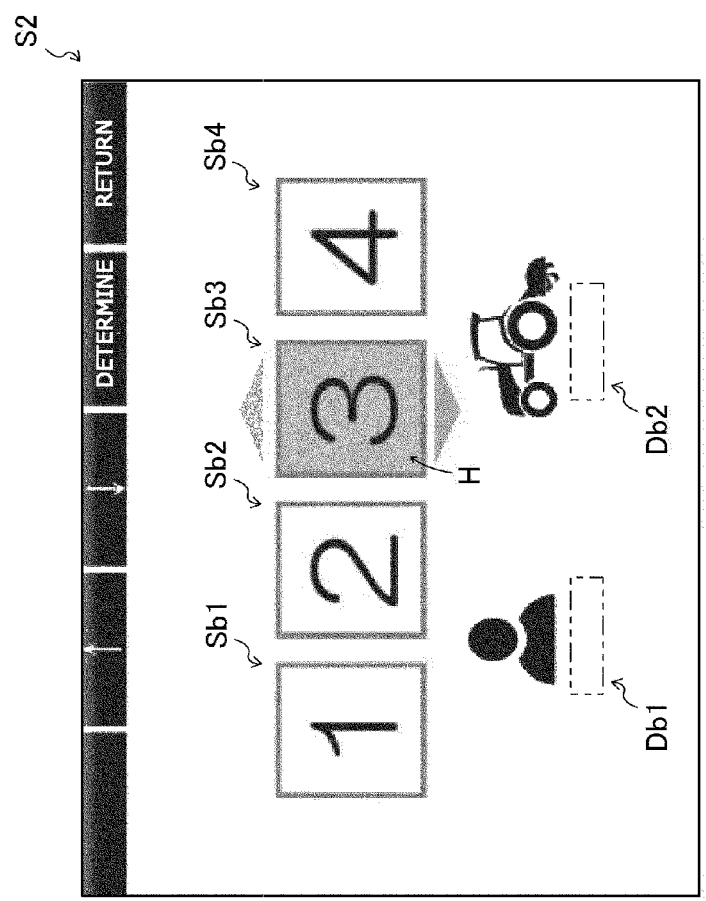
FIG. 13 is a diagram illustrating a screen displayed on the display.

Next, the display 2 displays an unlock screen S2 (see FIG. 13). The unlock screen S2 displays scroll boxes Sb1, Sb2, Sb3, and Sb4 for inputting a single row of PIN code. A selected one of the scroll boxes Sb1, Sb2, Sb3, and Sb4 is highlighted (see a section H in the figure). In the scroll boxes Sb1, Sb2, Sb3, and Sb4, any one of the numbers 0 to 9 and alphabets A to F can be selected through scrolling. The operator can select a number or an alphabet by rotating the encoder dial 22, and determine the number or the alphabet by pressing the enter button 23.

In the unlock screen S2, the command button 25 or 26 can be pressed to select between the numbers or alphabets, and determine the number or alphabet by pressing the command button 27. The determination may be cancelled by pressing the command button 28. When an incorrect PIN code is input, a message indicating that the number is incorrect is displayed. The unlock screen S2 displays a dialog box Db1 including the name of the operator and a dialog box Db2 including a work schedule. Thus, the operator can recognize his or her work schedule with the dialog boxes Db1 and Db2.

Figure 14:
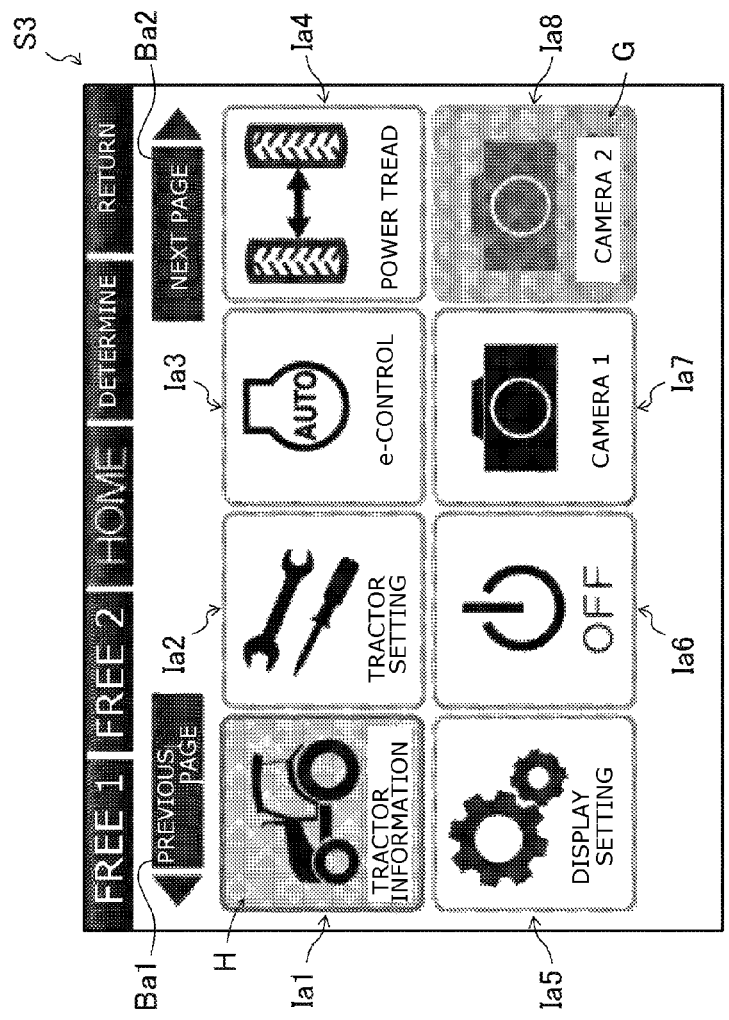
FIG. 14 is a diagram illustrating a screen displayed on the display.

Next, the display 2 displays the home screen S3 (see FIG. 14). The home screen S3 displays icons Ia1, Ia2, Ia3, Ia4, . . . and Ia8 in two upper and lower rows for selecting a menu. Selected one of the icons Ia1, Ia2, Ia3, Ia4, . . . and Ia8 is highlighted (see a section H in the figure). The highlight is shifted by rotating the encoder dial 22. The operator selects a desired one of the icons (any one of Ia1, Ia2, Ia3, Ia4, . . . and Ia8) by rotating the encoder dial 22, and determine the icon by pressing the enter button 23.

On the home screen S3, the icon (any one of Ia1, Ia2, Ia3, Ia4, . . . and Ia8) cannot be selected by pressing the command button (any one of 24, 25, 26, 27, and 28), but can be determined by pressing the command button 27. The screen can return to the unlock screen S2 by pressing the command button 28. Furthermore, the screen can be switched to another home screen selected and determined with a button Ba1 with a description "previous page" or a button Ba2 with a description "next page". Icons that cannot be selected are grayed out (see a section G in the figure).

Here, the icon Ia2 with a description "tractor setting" is selected and determined.

Figure 15:
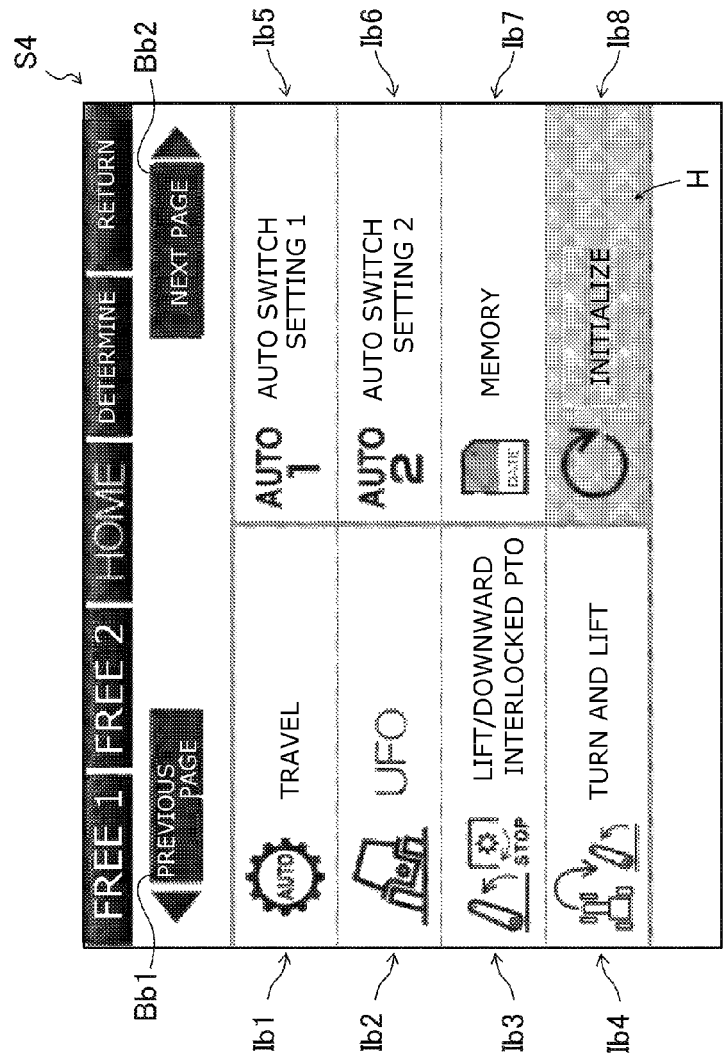
FIG. 15 is a diagram illustrating a screen displayed on the display.

The display 2 displays the customize screen S4 (see FIG. 15). The customize screen S4 displays two left and right columns of icons Ib1, Ib2, Ib3, Ib4, . . . and Ib8. The selected one of the icons Ib1, Ib2, Ib3, Ib4, . . . and Ib8 is highlighted (see the section H in the figure). The highlight is shifted by rotating the encoder dial 22. The operator can select the desired one of the icons (any one of Ib1, Ib2, Ib3, Ib4, . . . and Ib8) by rotating the encoder dial 22, and determine the icon by pressing the enter button 23.

On the customize screen S4, the icon (any one of Ib1, Ib2, Ib3, Ib4, . . . and Ib8) cannot be selected by pressing the command button (any one of 24, 25, 26, 27, and 28) but can be determined by pressing the command button 27. The screen can return to the home screen S3 by pressing the command button 28. Furthermore, the screen can be switched to another customize screen selected and determined with a button Bb1 with a description "previous page" or a button Bb2 with a description "next page". Icons that cannot be selected are grayed out (not illustrated).

Next, a case is described where the icon Ib1 with a description "travel" is selected and determined in the customize screen S4.

Figure 16:
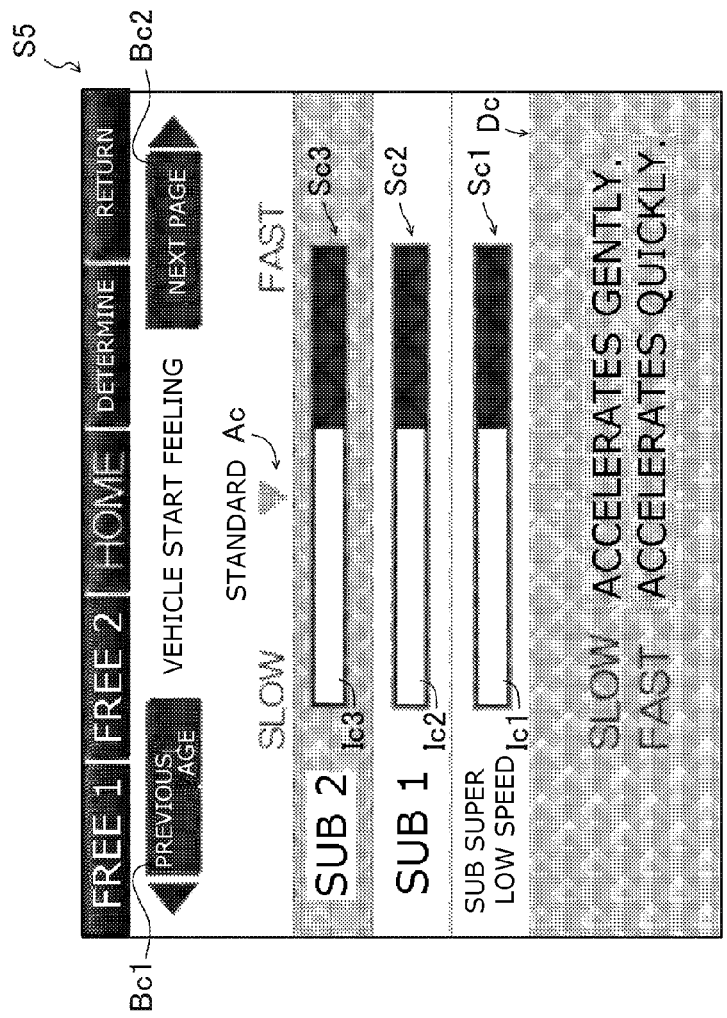
FIG. 16 is a diagram illustrating a screen displayed on the display.

The display 2 displays the travel customization screen S5 (see FIG. 16). On the travel customization screen S5, an acceleration characteristic can be adjusted for each operated position (positions corresponding to "super low speed", "first speed", and "second speed") of the shift lever 163. On the travel customization screen S5, three slide bars Sc1, Sc2, and Sc3 are vertically arranged. Each of the slide bars Sc1, Sc2, and Sc3 is described in detail below.

The slide bar Sc1 is a portion with which the acceleration characteristic can be adjusted with the shift lever 163 being at the operated position corresponding to "super low speed". The slide bar Sc1 can be slid toward the left end to achieve a slower acceleration characteristic and can be slid toward the right end to achieve a quicker acceleration characteristic. An arrow Ac at a substantially center portion of the slide bar Sc1 indicates a position where a standard state is achieved. Thus, when an indicator Ic1 on the slide bar Sc1 is on the left side of the arrow Ac, a slower acceleration characteristic compared with the standard state is achieved, and thus a gentle acceleration is obtained by an operation of the operator. On the other hand, when the indicator Ic1 on the slide bar Sc1 is on the right side of the arrow Ac, a quicker acceleration characteristic compared with the standard state is achieved, and thus a quick acceleration is obtained by an operation of the operator. The operator can extend or contract the indicator Ic1 by rotating the encoder dial 22, and determine the characteristic by pressing the enter button 23.

The slide bar Sc2 is a portion with which the acceleration characteristic can be adjusted with the shift lever 163 being at the operated position corresponding to "first speed". The slide bar Sc2 can be slid toward the left end to achieve a slower acceleration characteristic and can be slid toward the right end to achieve a quicker acceleration characteristic. The arrow Ac at a substantially center portion of the slide bar Sc2 indicates a position where a standard state is achieved. Thus, when an indicator Ic2 on the slide bar Sc2 is on the left side of the arrow Ac, a slower acceleration characteristic compared with the standard state is achieved, and thus a gentle acceleration is obtained by an operation of the operator. On the other hand, when the indicator Ic2 on the slide bar Sc2 is on the right side of the arrow Ac, a quicker acceleration characteristic compared with the standard state is achieved, and thus a quick acceleration is obtained by an operation of the operator. The operator can extend or contract the indicator Ic2 by rotating the encoder dial 22, and determine the characteristic by pressing the enter button 23.

The slide bar Sc3 is a portion with which the acceleration characteristic can be adjusted with the shift lever 163 being at the operated position corresponding to "second speed". The slide bar Sc3 can be slid toward the left end to achieve a slower acceleration characteristic and can be slid toward the right end to achieve a quicker acceleration characteristic. The arrow Ac at a substantially center portion of the slide bar Sc3 indicates a position where a standard state is achieved. Thus, when an indicator Ic3 on the slide bar Sc3 is on the left side of the arrow Ac, a slower acceleration characteristic compared with the standard state is achieved, and thus a gentle acceleration is obtained by an operation of the operator. On the other hand, when the indicator Ic3 on the slide bar Sc3 is on the right side of the arrow Ac, a quicker acceleration characteristic compared with the standard state is achieved, and thus a quick acceleration is obtained by an operation of the operator. The operator can extend or contract the indicator Ic3 by rotating the encoder dial 22, and determine the characteristic by pressing the enter button 23.

On the travel customization screen S5, the indicators Ic1, Ic2, and Ic3 cannot be extended or contracted by pressing the command button (any one of 24, 25, 26, 27, and 28). Still, the command button 27 can be pressed for the determination. A dialog box Dc describes how the screen is operated. The screen can return to the customize screen S4 by pressing the command button 28.

Next, a case is described where a button Bc2 with a description "Next page" is selected and determined in the travel customization screen S5.

Figure 17:
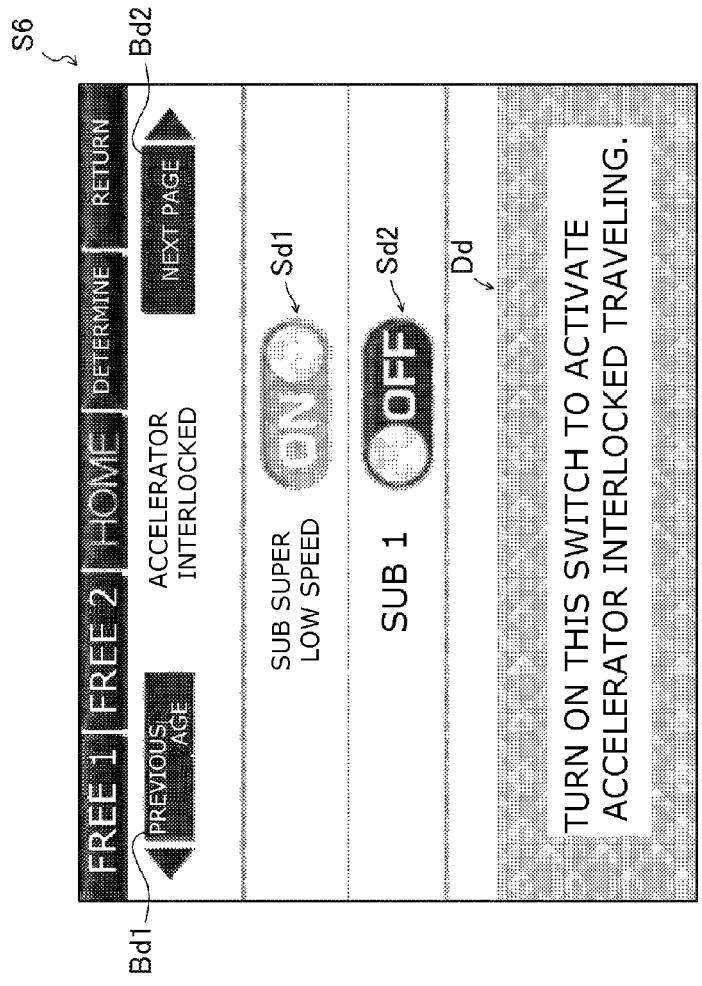
FIG. 17 is a diagram illustrating a screen displayed on the display.

The display 2 displays the travel customization screen S6 (see FIG. 17). On the travel customization screen S6, whether accelerator interlocked traveling is allowed can be selected for each operated position of the shift lever 163 (the positions corresponding to the "super low speed" and "first speed" in the tractor 1). The travel customization screen S6 displays two upper and lower select switches Sd1 and Sd2. The select switches Sd1 and Sd2 are described in detail below. It is predetermined in the tractor 1 that the accelerator interlocked traveling is allowed when the shift lever 163 is at the operated position "second speed".

The select switch Sd1 is a portion with which whether the accelerator interlocked traveling is allowed is selectable with the shift lever 163 being at the operated position corresponding to "super low speed". When the select switch Sd1 is "ON", a predetermined program is executed so that the accelerator interlocked traveling is implemented. Thus, when the select switch Sd1 is "ON", a control mode featuring the traveling state changeable in accordance with an operation on the accelerator pedal 162 is achieved. On the other hand, when the select switch Sd1 is "OFF", the predetermined program is not executed, and thus the accelerator interlocked traveling is not implemented. Thus, when the select switch Sd1 is "OFF", a control mode featuring the traveling state unchangeable by the operation on the accelerator pedal 162 is achieved. The operator can select between "ON" and "OFF" by rotating the encoder dial 22, and determine the selected mode by pressing the enter button 23. The mode not allowing the accelerator interlocked traveling cannot be selected while the vehicle is traveling, whereby the traveling state is prevented from largely changing.

The select switch Sd2 is a portion with which whether the accelerator interlocked traveling is allowed can be selected with the shift lever 163 being at the operated position corresponding to "low speed". When the select switch Sd2 is "ON", a predetermined program is executed so that the accelerator interlocked traveling is implemented. Thus, when the select switch Sd2 is "ON", a control mode featuring the traveling state changeable in accordance with an operation on the accelerator pedal 162 is achieved. On the other hand, when the select switch Sd2 is "OFF", the predetermined program is not executed, and thus the accelerator interlocked traveling is not implemented. Thus, when the select switch Sd2 is "OFF", a control mode featuring the traveling state unchangeable by the operation on the accelerator pedal 162 is achieved. The operator can select between "ON" and "OFF" by rotating the encoder dial 22, and determine the selected mode by pressing the enter button 23. The mode not allowing the accelerator interlocked traveling cannot be selected while the vehicle is traveling, whereby the traveling state is prevented from largely changing.

As described above, the tractor 1 (work vehicle) includes the display 2 disposed near the operator's seat 161. The display 2 can display a screen (travel customization screen S6) for selecting whether to allow the accelerator interlocked traveling. Thus, an operation of selecting whether to allow the accelerator interlocked traveling can be easily performed by the operator watching the screen (travel customization screen S6) on the tractor 1 (work vehicle).

More specifically, the display 2 can display the screen (travel customization screen S6) selecting whether to allow the accelerator interlocked traveling for each operated position of the shift lever 163. Thus, in the tractor 1 (work vehicle), whether to allow the accelerator interlocked traveling can be selected for each operated position of the shift lever 163.

On the travel customization screen S6, the select switches Sd1 and Sd2 cannot be switched by pressing the command button (any one of 24, 25, 26, 27, and 28), but can make the determination by pressing the command button 27. The dialog box Dd describes how the screen is operated. When the command button 28 is pressed, the screen can return to the customize screen S4. When a button Bd1 with a description "previous page" is selected and determined, the screen can return to the travel customization screen S5. When a button Bd2 with a description "next page" is selected and determined, the screen switches to another travel customization screen.

Next, an operation method for adjusting the acceleration characteristic of the vehicle started by operating the brake pedal 166 is described. Here, "the vehicle is started by operating the brake pedal 166" means that the vehicle in the stopped state starts traveling when the operator releases the brake pedal 166. The concept "vehicle starts" includes forward traveling and backward traveling.

Figure 18:
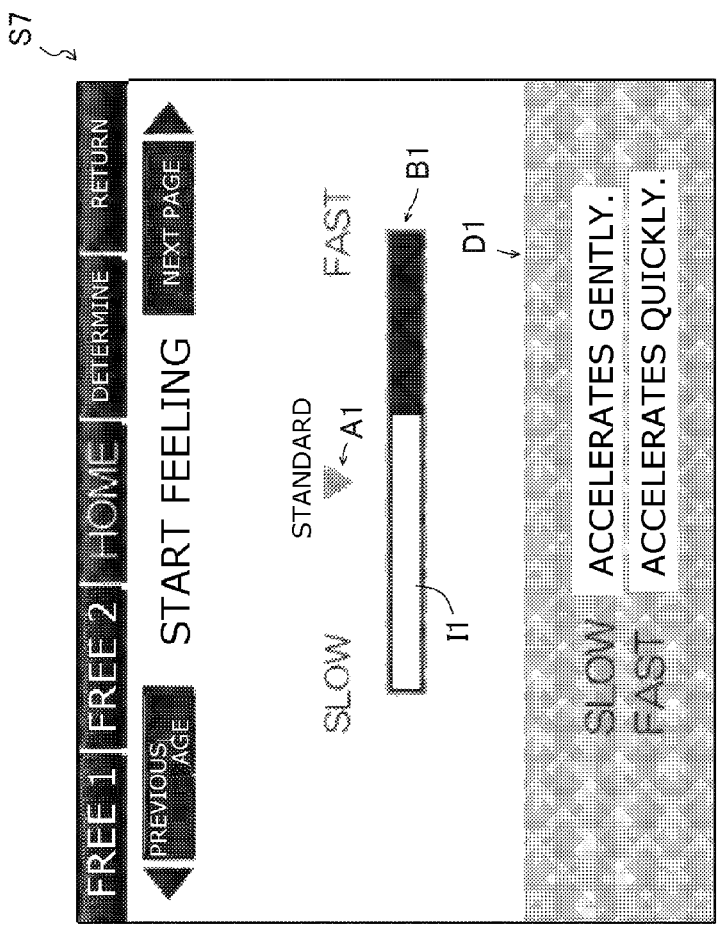
FIG. 18 is a diagram illustrating a screen displayed on the display.

When a predetermined operation is performed, the display 2 displays a first setting screen S7 (see FIG. 18). On the first setting screen S7, an acceleration characteristic of a vehicle, starting in response to the releasing of the brake pedal 166 by the operator, can be adjusted. The first setting screen S7 displays a dialog box D1 describing how to operate the screen. The first setting screen S7 displays a single slide bar B1. The slide bar B1 is described in detail below.

Figure 22:
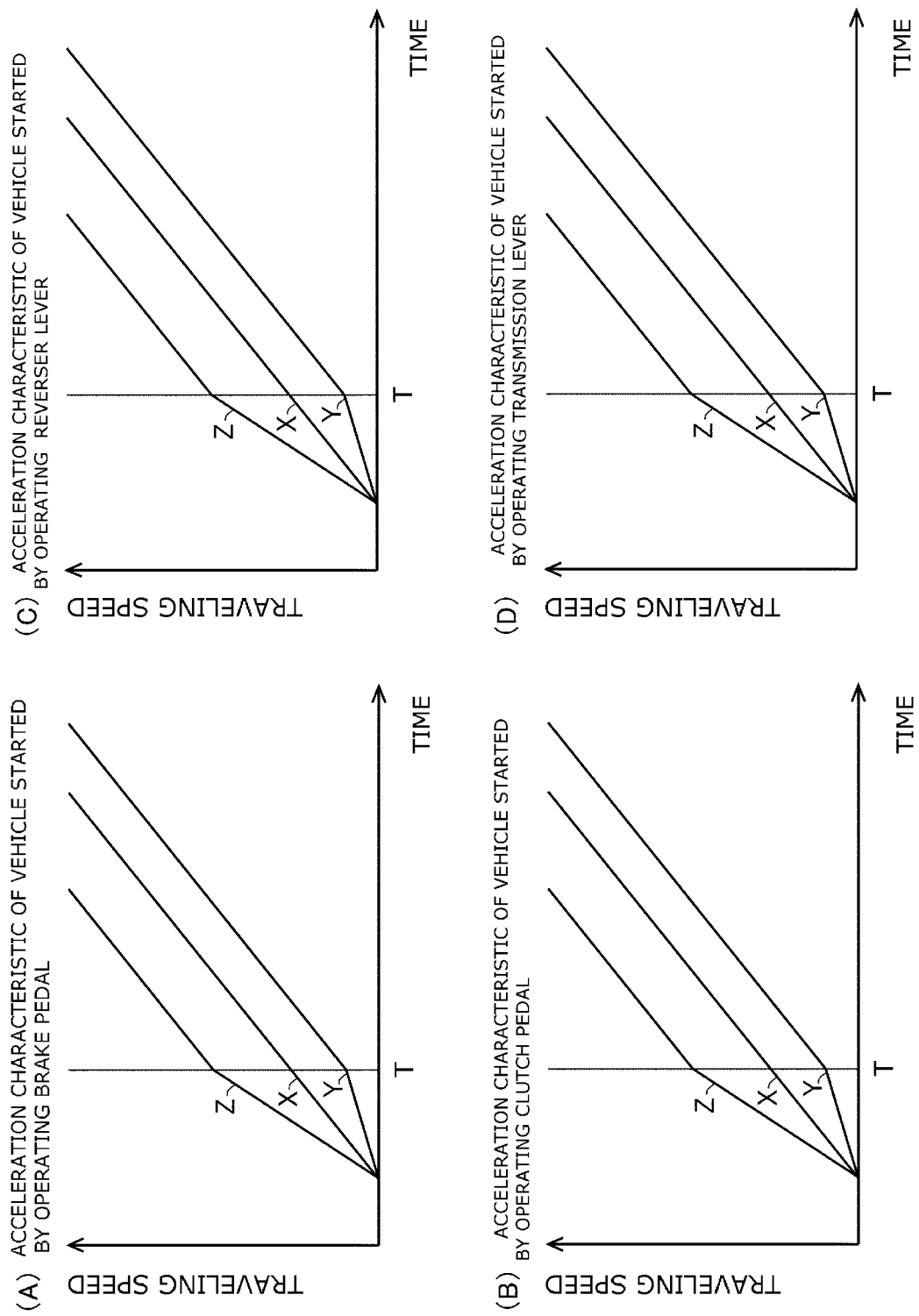
FIG. 22 is a diagram illustrating acceleration characteristics achieved by respective operation control devices.

The slide bar B1 is a portion with which the acceleration characteristic, for the vehicle starting in response to the releasing of the brake pedal 166 by the operator, can be adjusted. The slide bar B1 can be slid toward the left end to achieve a slower acceleration characteristic and can be slid toward the right end to achieve a quicker acceleration characteristic. An arrow A1 at a substantially center portion of the slide bar B1 indicates a position where a standard state is achieved. Thus, when an indicator I1 of the slide bar B1 is at the position indicated by the arrow A1, the standard acceleration characteristic is achieved so that acceleration corresponding to the operation of the operator is achieved (see X in FIG. 22(A)). On the other hand, when the indicator I1 of the slide bar B1 is on the left side of the arrow A1, a slower acceleration characteristic compared with the standard state is achieved, and thus a gentle acceleration is obtained by an operation of the operator (see Y in FIG. 22(A)). On the other hand, when the indicator I1 of the slide bar B1 is on the right side of the arrow A1, a quicker acceleration characteristic compared with the standard state is achieved, and thus a quick acceleration is obtained by an operation of the operator (see Z in FIG. 22(A)).

The adjustment of the acceleration characteristic is achieved by the controller 3 controlling the response speed of the continuously variable transmission 33. More specifically, the adjustment is achieved by adjusting the moving speed of the cradle 337 forming the continuously variable transmission 33. When a predetermined time T elapses after the tractor 1 has started, a constant acceleration is achieved. The operator can appropriately set the time T.

As described above, the tractor 1 (work vehicle) includes the brake operation device (brake pedal 166) as the operation control device. The acceleration characteristic of the starting tractor 1 (work vehicle) can be adjusted by operating the brake operation device (brake pedal 166). In this manner, the present tractor 1 (work vehicle) can achieve a drive feeling suitable for the operator.

Next, an operation method for adjusting the acceleration characteristic of the vehicle started by operating the clutch pedal 167 is described. Here, "the vehicle is started by operating the clutch pedal 167" means that the vehicle in the stopped state starts traveling when the operator releases the clutch pedal 167. The concept "vehicle starts" includes forward traveling and backward traveling.

Figure 19:
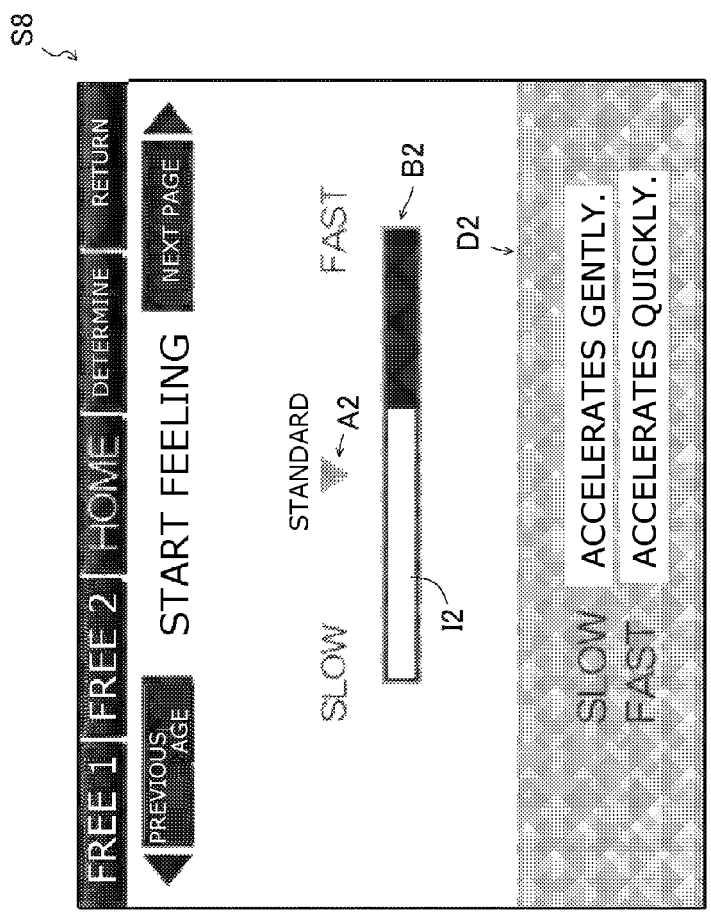
FIG. 19 is a diagram illustrating a screen displayed on the display.

When a predetermined operation is performed, the display 2 displays a second setting screen S8 (see FIG. 19). On the second setting screen S8, an acceleration characteristic of a vehicle, starting in response to the releasing of the clutch pedal 167 by the operator, can be adjusted. The second setting screen S8 displays a dialog box D2 describing how to operate the screen. The second setting screen S8 displays a single slide bar B2. The slide bar B2 is described in detail below.

The slide bar B2 is a portion with which the acceleration characteristic, for the vehicle starting in response to the releasing of the clutch pedal 167 by the operator, can be adjusted. The slide bar B2 can be slid toward the left end to achieve a slower acceleration characteristic and can be slid toward the right end to achieve a quicker acceleration characteristic. An arrow A2 at a substantially center portion of the slide bar B2 indicates a position where a standard state is achieved. Thus, when an indicator I2 of the slide bar B2 is at the position indicated by the arrow A2, the standard acceleration characteristic is achieved so that acceleration corresponding to the operation of the operator is achieved (see X in FIG. 22(B)). On the other hand, when the indicator I2 of the slide bar B2 is on the left side of the arrow A2, a slower acceleration characteristic compared with the standard state is achieved, and thus a gentle acceleration is obtained by an operation of the operator (see Y in FIG. 22(B)). On the other hand, when the indicator 12 of the slide bar B2 is on the right side of the arrow A2, a quicker acceleration characteristic compared with the standard state is achieved, and thus a quick acceleration is obtained by an operation of the operator (see Z in FIG. 22(B)).

The adjustment of the acceleration characteristic is achieved by the controller 3 controlling the response speed of the continuously variable transmission 33. More specifically, the adjustment is achieved by adjusting the moving speed of the cradle 337 forming the continuously variable transmission 33. When a predetermined time T elapses after the tractor 1 has started, a constant acceleration is achieved. The operator can appropriately set the time T.

As described above, the tractor 1 (work vehicle) includes the clutch operation device (clutch pedal 167) as the operation control device. The acceleration characteristic of the starting tractor 1 (work vehicle) can be adjusted by operating the clutch operation device (clutch pedal 167). In this manner, the present tractor 1 (work vehicle) can achieve a drive feeling suitable for the operator.

Next, an operation method for adjusting the acceleration characteristic of the vehicle started by operating the reverser lever 168 is described. Here, "the vehicle is started by operating the reverser lever 168" means that the vehicle in the stopped state starts traveling when the operator sets the reverser lever 168 to be at a predetermined position. The concept "vehicle starts" includes forward traveling and backward traveling.

Figure 20:
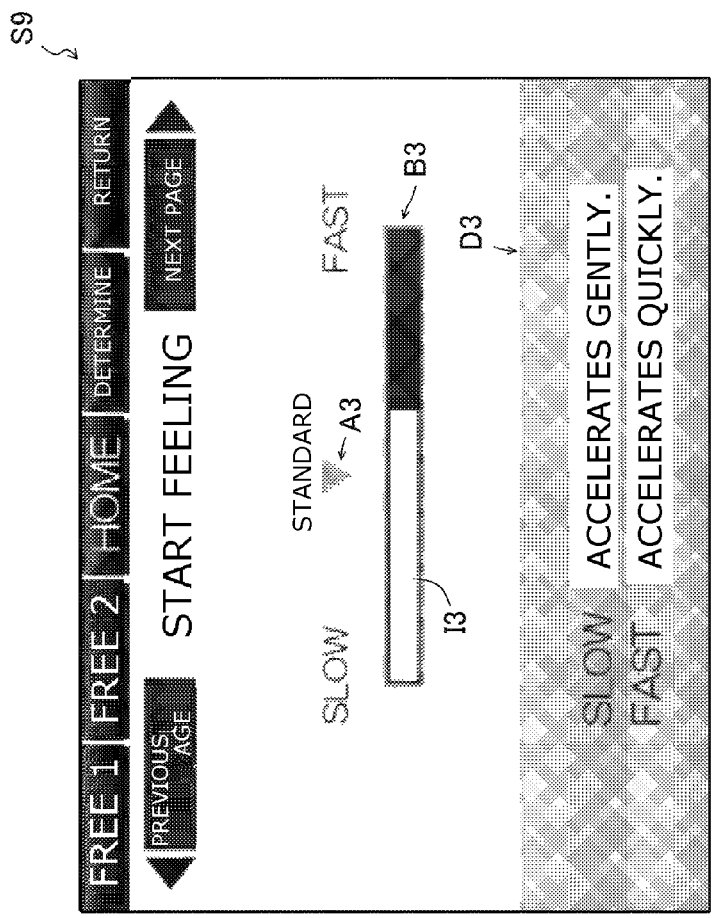
FIG. 20 is a diagram illustrating a screen displayed on the display.

When a predetermined operation is performed, the display 2 displays a third setting screen S9 (see FIG. 20). On the third setting screen S9, an acceleration characteristic of a vehicle, starting in response to the moving of the reverser lever 168 to the predetermined position by the operator, can be adjusted. The third setting screen S9 displays a dialog box D3 describing how to operate the screen. The third setting screen S9 displays a single slide bar B3. The slide bar B3 is described in detail below.

The slide bar B3 is a portion with which the acceleration characteristic, for the vehicle starting in response to the moving of the reverser lever 168 to the predetermined position by the operator, can be adjusted. The slide bar B3 can be slid toward the left end to achieve a slower acceleration characteristic and can be slid toward the right end to achieve a quicker acceleration characteristic. An arrow A3 at a substantially center portion of the slide bar B3 indicates a position where a standard state is achieved. Thus, when an indicator 13 of the slide bar B3 is at the position indicated by the arrow A3, the standard acceleration characteristic is achieved so that acceleration corresponding to the operation of the operator is achieved (see X in FIG. 22(C)). On the other hand, when the indicator 13 of the slide bar B3 is on the left side of the arrow A3, a slower acceleration characteristic compared with the standard state is achieved, and thus a gentle acceleration is obtained by an operation of the operator (see Y in FIG. 22(C)). On the other hand, when the indicator 13 of the slide bar B3 is on the right side of the arrow A3, a quicker acceleration characteristic compared with the standard state is achieved, and thus a quick acceleration is obtained by an operation of the operator (see Z in FIG. 22(C)).

The adjustment of the acceleration characteristic is achieved by the controller 3 controlling the response speed of the continuously variable transmission 33. More specifically, the adjustment is achieved by adjusting the moving speed of the cradle 337 forming the continuously variable transmission 33. When a predetermined time T elapses after the tractor 1 has started, a constant acceleration is achieved. The operator can appropriately set the time T.

As described above, the tractor 1 (work vehicle) includes the forward-backward traveling switching operation device (reverser lever 168) as the operation control device. The acceleration characteristic of the starting tractor 1 (work vehicle) can be adjusted by operating the forward-backward traveling switching operation device (reverser lever 168). In this manner, the present tractor 1 (work vehicle) can achieve a drive feeling suitable for the operator.

Furthermore, the acceleration characteristic can be adjusted for the tractor 1 (work vehicle) starting with the traveling direction reversed by an operation on the forward-backward traveling switching operation device (reverser lever 168) (starting after forward traveling is switched to backward traveling, or after backward traveling is switched to forward traveling). Thus, the work vehicle can achieve a drive feeling suitable for the operator.

Next, an operation method for adjusting the acceleration characteristic of the vehicle started by operating a transmission lever 172 is described. Here, "the vehicle is started by operating the transmission lever 172" means that the vehicle in the stopped state starts traveling when the operator sets the transmission lever 172 to be at a predetermined position. The concept "vehicle starts" includes forward traveling and backward traveling.

Figure 21:
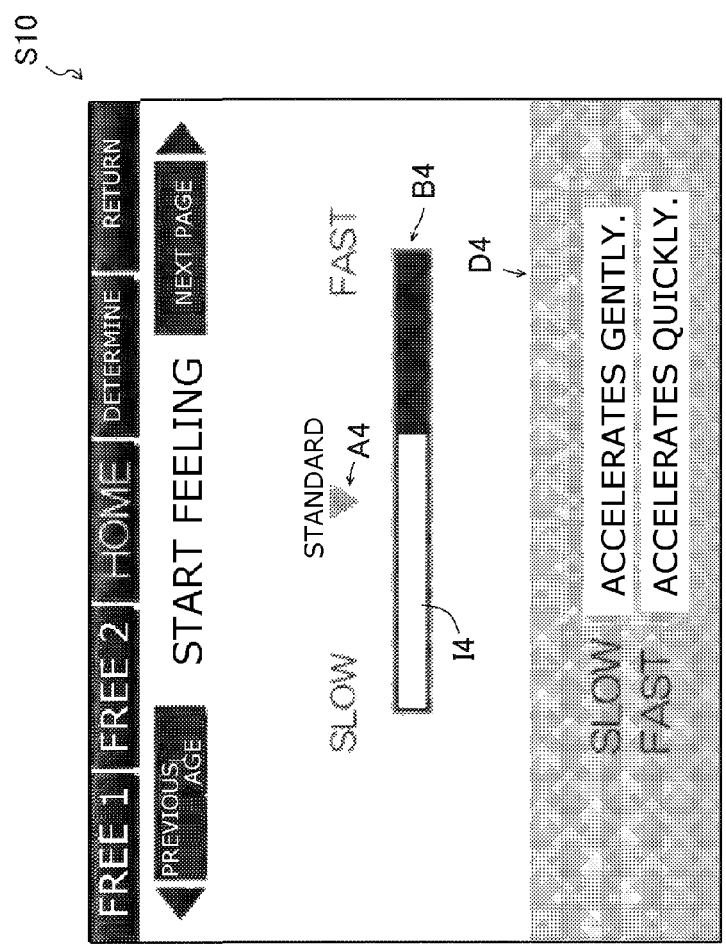
FIG. 21 is a diagram illustrating a screen displayed on the display.

When a predetermined operation is performed, the display 2 displays a fourth setting screen S10 (see FIG. 21). On the fourth setting screen S10, an acceleration characteristic of a vehicle, starting in response to the moving of the transmission lever 172 to the predetermined position by the operator, can be adjusted. The fourth setting screen S10 displays a dialog box D4 describing how to operate the screen. The fourth setting screen S10 displays a single slide bar B4. The slide bar B4 is described in detail below.

The slide bar B4 is a portion with which the acceleration characteristic, for the vehicle starting in response to the moving of the transmission lever 172 to the predetermined position by the operator, can be adjusted. The slide bar B4 can be slid toward the left end to achieve a slower acceleration characteristic and can be slid toward the right end to achieve a quicker acceleration characteristic. An arrow A4 at a substantially center portion of the slide bar B4 indicates a position where a standard state is achieved. Thus, when an indicator 14 of the slide bar B4 is at the position indicated by the arrow A4, the standard acceleration characteristic is achieved so that acceleration corresponding to the operation of the operator is achieved (see X in FIG. 22(D)). On the other hand, when the indicator 14 of the slide bar B4 is on the left side of the arrow A4, a slower acceleration characteristic compared with the standard state is achieved, and thus a gentle acceleration is obtained by an operation of the operator (see Y in FIG. 22(D)). On the other hand, when the indicator 14 of the slide bar B4 is on the right side of the arrow A4, a quicker acceleration characteristic compared with the standard state is achieved, and thus a quick acceleration is obtained by an operation of the operator (see Z in FIG. 22(D)).

The adjustment of the acceleration characteristic is achieved by the controller 3 controlling the response speed of the continuously variable transmission 33. More specifically, the adjustment is achieved by adjusting the moving speed of the cradle 337 forming the continuously variable transmission 33. When a predetermined time T elapses after the tractor 1 has started, a constant acceleration is achieved. The operator can appropriately set the time T.

As described above, the tractor 1 (work vehicle) includes the shift operation device (transmission lever 172) as the operation control device. The acceleration characteristic of the starting tractor 1 (work vehicle) can be adjusted by operating the shift operation device (transmission lever 172). In this manner, the present tractor 1 (work vehicle) can achieve a drive feeling suitable for the operator.

Furthermore, the acceleration characteristic can be adjusted for the tractor 1 (work vehicle) starting with the traveling speed changed by operating the shift operation device (transmission lever 172) (change for accelerating the traveling speed or change for decelerating the traveling speed). Thus, the work vehicle can achieve a drive feeling suitable for the operator.

Figure 23:
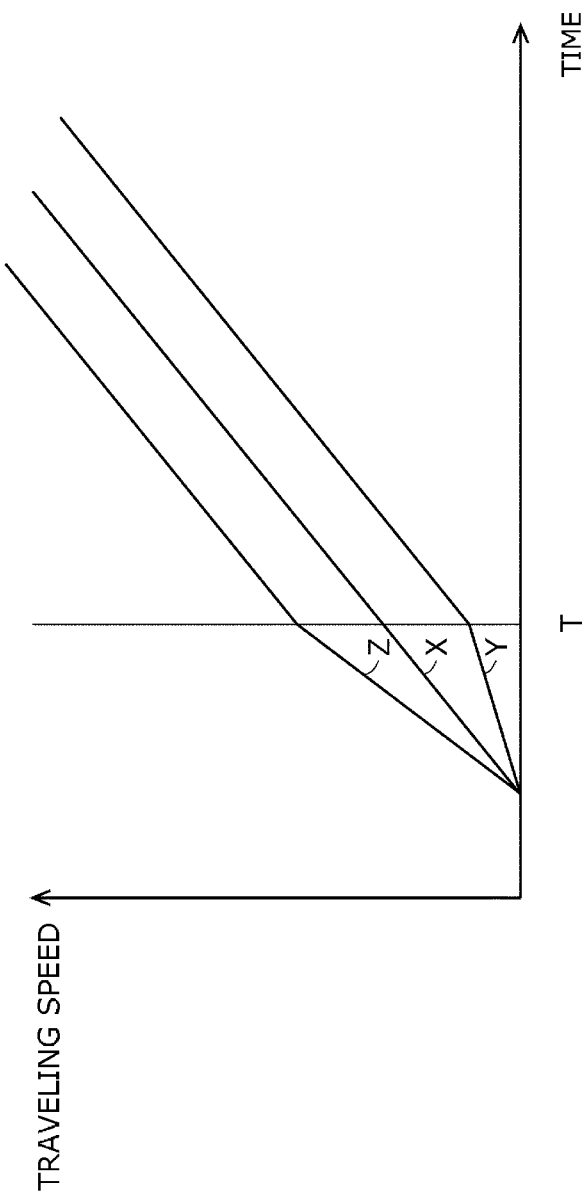
FIG. 23 is a diagram illustrating acceleration characteristics achieved by respective operation control devices.

In the present tractor 1, the acceleration characteristic can be adjusted for each operation control device (the brake pedal 166, the clutch pedal 167, . . . ). Thus, for example, a standard acceleration characteristic (see X in FIG. 23) can be achieved for the vehicle traveling in response to the releasing of the brake pedal 166 or the clutch pedal 167, a gentle acceleration characteristic (see Y in FIG. 23) can be achieved for the vehicle starting in response to the moving of the reverser lever 168 to the predetermined position, and a quick acceleration characteristic (see Z in FIG. 23) can be achieved for vehicle starting in response to the moving of the transmission lever 172 to the predetermined position. The display 2 may display a single screen with which the acceleration characteristic can be adjusted for all the operation control devices (the brake pedal 166, the clutch pedal 167, . . . ).

Next, an operation method for adjusting the acceleration characteristic for each of the operated positions (the positions corresponding to "super low speed", "first speed", and "second speed") of the shift lever 163 is described. Here, the concept "acceleration characteristic" not only includes the acceleration characteristic of a vehicle starting from the stopped state, but also includes an acceleration characteristic after changing the travelling speed. The concept "vehicle starts" includes forward traveling and backward traveling.

Figure 24:
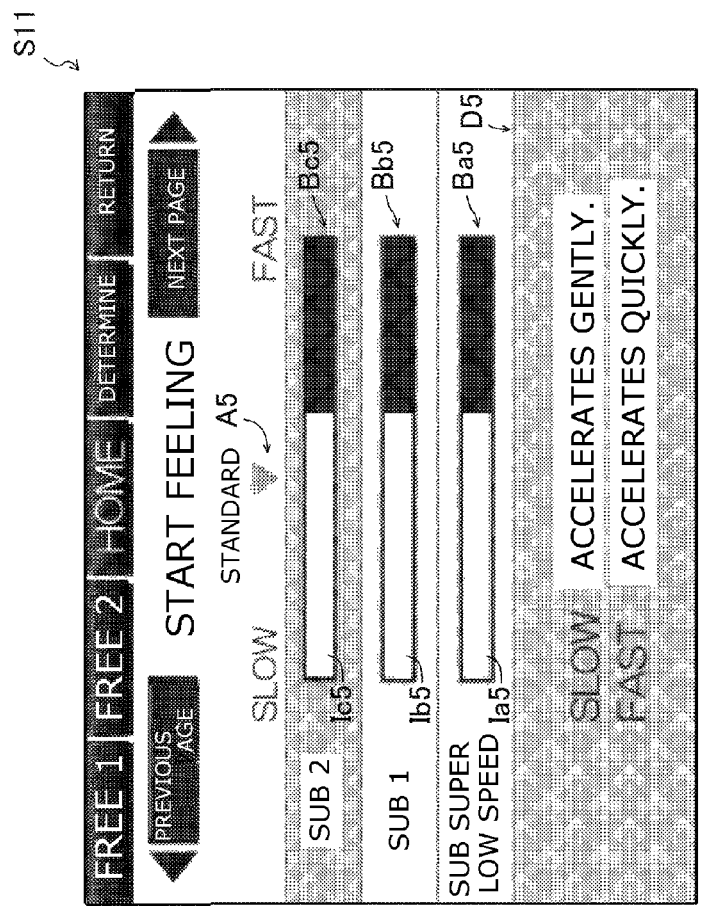
FIG. 24 is a diagram illustrating a screen displayed on the display.

When a predetermined operation is performed, the display 2 displays a fifth setting screen S11 (see FIG. 24). On the fifth setting screen S11, the acceleration characteristic for each of the operated positions (the positions corresponding to "super low speed", "first speed", and "second speed") of the shift lever 163 can be adjusted. The fifth setting screen S11 displays a dialog box D5 describing how to operate the screen. The fifth screen S11 displays three slide bars Ba5, Bb5, and Bc5. The three slide bars Ba5, Bb5, and Bc5 are described below in detail.

Figure 25:
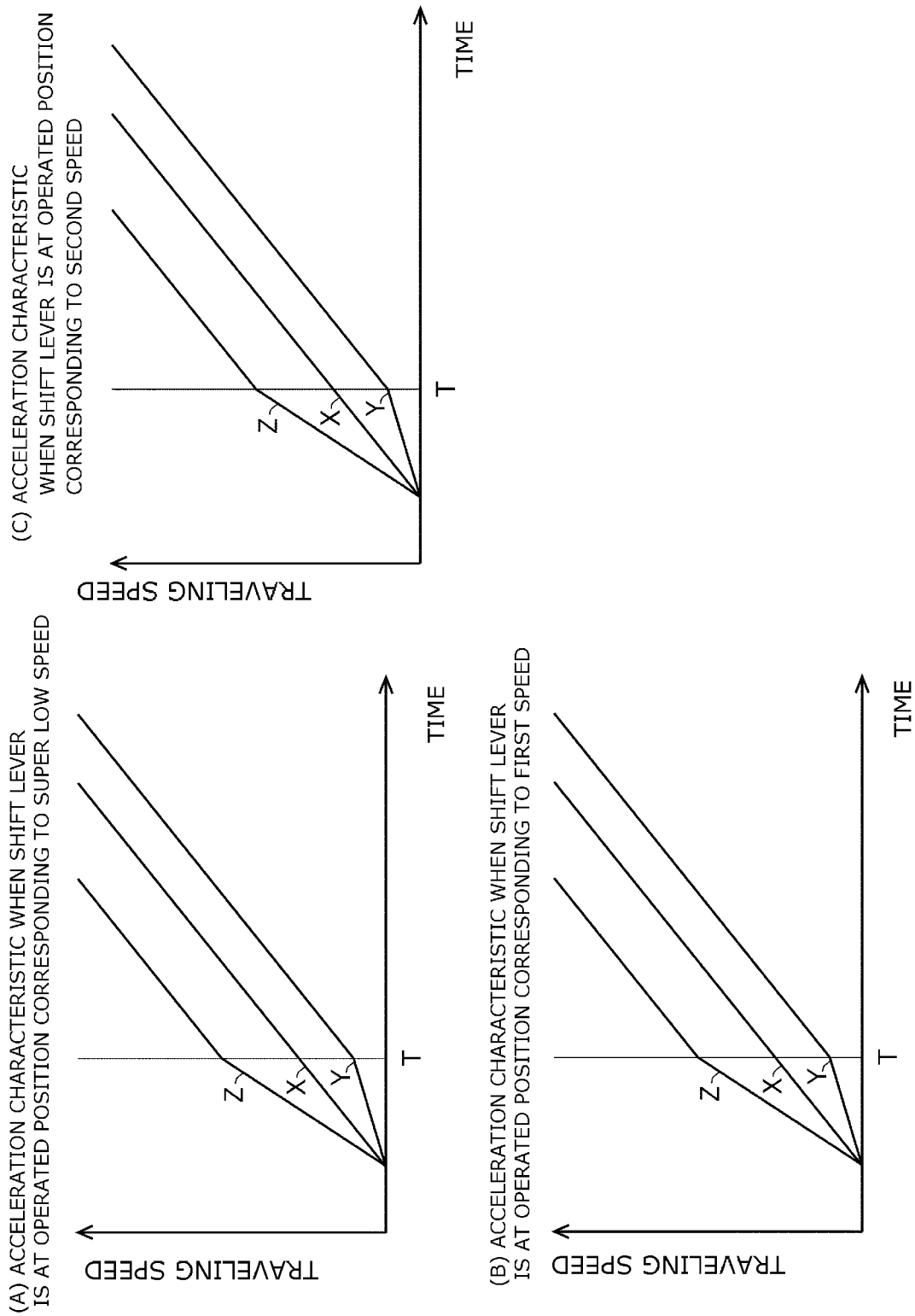
FIG. 25 is a diagram illustrating acceleration characteristics achieved at respective operated positions of a shift lever.

The slide bar Ba5 is a portion with which the acceleration characteristic can be adjusted with the shift lever 163 at the operated position "super low speed". The slide bar Ba5 can be slid toward the left end to achieve a slower acceleration characteristic and can be slid toward the right end to achieve a quicker acceleration characteristic. An arrow A5 at a substantially center portion of the slide bar Ba5 indicates a position where a standard state is achieved. Thus, when an indicator Ia5 of the slide bar Ba5 is at the position indicated by the arrow A5, the standard acceleration characteristic is achieved so that acceleration corresponding to the operation of the operator is achieved (see X in FIG. 25(A)). On the other hand, when the indicator Ia5 of the slide bar Ba5 is on the left side of the arrow A5, a slower acceleration characteristic compared with the standard state is achieved, and thus a gentle acceleration is obtained by an operation of the operator (see Y in FIG. 25(A)). On the other hand, when the indicator Ia5 of the slide bar Ba5 is on the right side of the arrow A5, a quicker acceleration characteristic compared with the standard state is achieved, and thus a quick acceleration is obtained by an operation of the operator (see Z in FIG. 25(A)).

The slide bar Bb5 is a portion with which the acceleration characteristic can be adjusted with the shift lever 163 at the operated position "first speed". The slide bar Bb5 can be slid toward the left end to achieve a slower acceleration characteristic and can be slid toward the right end to achieve a quicker acceleration characteristic. The arrow A5 at a substantially center portion of the slide bar Bb5 indicates a position where a standard state is achieved. Thus, when an indicator Ib5 of the slide bar Bb5 is at the position indicated by the arrow A5, the standard acceleration characteristic is achieved so that acceleration corresponding to the operation of the operator is achieved (see X in FIG. 25(B)). On the other hand, when the indicator Ib5 of the slide bar Bb5 is on the left side of the arrow A5, a slower acceleration characteristic compared with the standard state is achieved, and thus a gentle acceleration is obtained by an operation of the operator (see Y in FIG. 25(B)). On the other hand, when the indicator Ib5 of the slide bar Bb5 is on the right side of the arrow A5, a quicker acceleration characteristic compared with the standard state is achieved, and thus a quick acceleration is obtained by an operation of the operator (see Z in FIG. 25(B)).

The slide bar Bc5 is a portion with which the acceleration characteristic can be adjusted with the shift lever 163 at the operated position "second speed". The slide bar Bc5 can be slid toward the left end to achieve a slower acceleration characteristic and can be slid toward the right end to achieve a quicker acceleration characteristic. The arrow A5 at a substantially center portion of the slide bar Bc5 indicates a position where a standard state is achieved. Thus, when an indicator Ic5 of the slide bar Bc5 is at the position indicated by the arrow A5, the standard acceleration characteristic is achieved so that acceleration corresponding to the operation of the operator is achieved (see X in FIG. 25(C)). On the other hand, when the indicator Ic5 of the slide bar Bc5 is on the left side of the arrow A5, a slower acceleration characteristic compared with the standard state is achieved, and thus a gentle acceleration is obtained by an operation of the operator (see Y in FIG. 25(C)). On the other hand, when the indicator Ic5 of the slide bar Bc5 is on the right side of the arrow A5, a quicker acceleration characteristic compared with the standard state is achieved, and thus a quick acceleration is obtained by an operation of the operator (see Z in FIG. 25(C)).

The adjustment of the acceleration characteristic is achieved by the controller 3 controlling the response speed of the continuously variable transmission 33. More specifically, the adjustment is achieved by adjusting the moving speed of the cradle 337 forming the continuously variable transmission 33. When a predetermined time T elapses after the tractor 1 has started, a constant acceleration is achieved. The operator can appropriately set the time T.

As described above, the tractor 1 (work vehicle) includes: the transmission 13 including the continuously variable transmission 33; and the shift lever 163 with which the operation state of the transmission 13 is changed. In the tractor 1 (work vehicle), the acceleration characteristic can be adjusted for each of the operated positions (the positions corresponding to "super low speed", "first speed", and "second speed") of the shift lever 163. Thus, the present tractor 1 (work vehicle) can achieve a drive feeling suitable for the operator.

Figure 26:
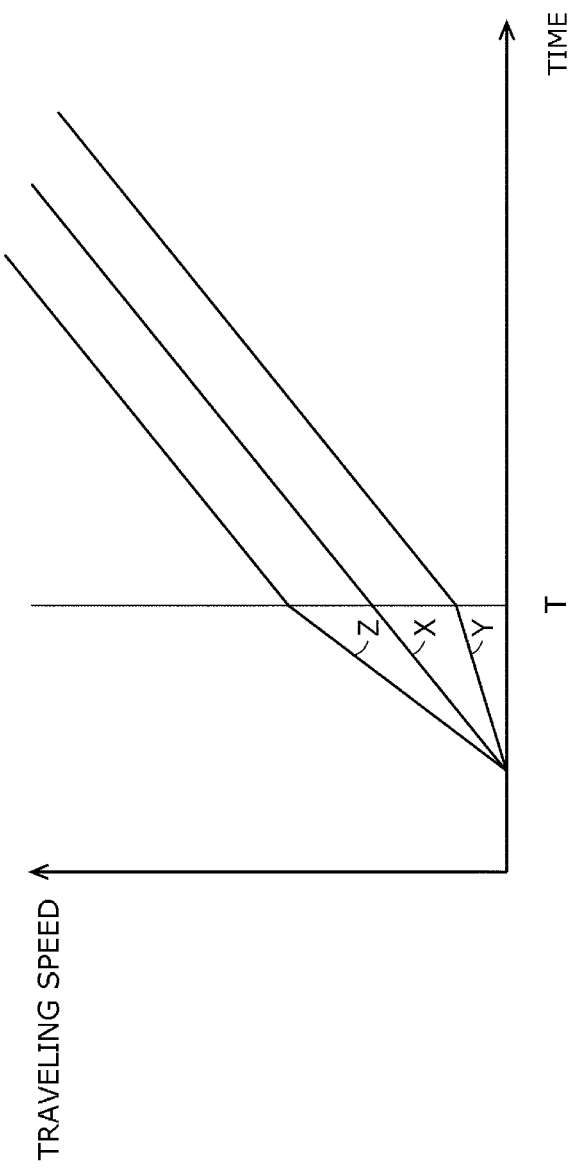
FIG. 26 is a diagram illustrating acceleration characteristics achieved at respective operated positions of the shift lever.

As described above, in the tractor 1, the acceleration characteristic can be adjusted for each of the operated positions (the positions corresponding to "super low speed", "first speed", and "second speed") of the shift lever 163. Thus, for example, the standard acceleration characteristic (see X in FIG. 26) may be achieved when the shift lever 163 is at the operated position "super low speed", the gentle acceleration characteristic (see Y in FIG. 26) may be achieved when the shift lever 163 is at the operated position "first speed", and a quick acceleration characteristic (see Z in FIG. 26) may be achieved when the shift lever 163 is at the operated position "second speed". The display 2 may display a single screen with which the acceleration characteristic can be adjusted for all the operated positions (the positions corresponding to "super low speed", "first speed", and "second speed") of the shift lever 163.

As described above, the present tractor 1 (work vehicle) includes the operation control device (the brake pedal 166, the clutch pedal 167, . . . ). The acceleration characteristic can be adjusted when the start and traveling speed of the tractor 1 (work vehicle) changes by operating the operation control device (the brake pedal 166, the clutch pedal 167, . . . ). Thus, the present tractor 1 (work vehicle) can achieve a drive feeling suitable for the operator.

The acceleration characteristic may be adjustable when the vehicle start and traveling speed is changed in accordance with the work machine attached to the tractor 1. The acceleration characteristic may be adjustable when the vehicle start and traveling speed changes in accordance with a traction load on the tractor 1. Thus, a work can be performed efficiently without damaging the farm field.

Next, a control configuration of the tractor 1 is described in detail.

First of all, a power transmission system of the tractor 1 is further described.

Sliding engagement members of the super low speed clutch 351, the first speed clutch 352, and the second speed clutch 353 can be slid to be selectively engaging with engagement portions of the super low speed driven gear 354, the first speed driven gear 355, and the second speed driven gear 356. The sliding members are slid in accordance with an operation on the transmission lever 172 (see FIG. 7), to be capable of engaging with any one of the engagement portions. The transmission lever 172 has a pivot base portion provided with a transmission lever sensor 62 including an angular sensor with which a transmission position of the transmission lever 172 can be detected. The transmission lever sensor 62 is connected to the controller 3.

With this structure, the rotational driving force from the countershaft 357 is transmitted to the front wheels 141 via the front axles 14. The rotational driving force from the countershaft 357 is transmitted to the rear wheels 151 via the rear axles 15. A speed detection unit 63 that detects the traveling speed of the tractor 1 is disposed in the power transmission path between the countershaft 357 and the rear wheels 151, and is configured to detect the traveling speed based on the rotation speed of the countershaft 357. The speed detection unit 63 is connected to the controller 3.

The continuously variable transmission 33 can change the rotation speed of the output shaft 332 by operating a shift actuator 330. More specifically, the continuously variable transmission 33 has a variable capacity hydraulic pump 33P with the amount and the direction of the transmitted hydraulic oil changeable by inclining the cradle 337. The cradle 337 is coupled to the shift actuator 330, and can be inclined by the operating the shift actuator 330, so that the rotation speed of the output shaft 332 can be changed. Thus, the tractor 1 in the traveling state stops when the continuously variable transmission 33 stops the rotation of the output shaft 332. Similarly, the tractor 1 in the stopped state starts traveling (the tractor 1 starts) when the continuously variable transmission 33 rotates the output shaft 332.

A PTO output gear 321 is fixed on the input shaft 331. The PTO output gear 321 meshes with a PTO input gear 322 provided on a PTO clutch 320. The PTO clutch 320 is provided on a PTO input shaft 323, and the power is transmittable from the PTO shaft 323 to a PTO shaft 18 via a PTO transmission 324 and a reduction gear. The PTO clutch 320 includes a hydraulic clutch, and can be "engaged" and "disengaged" by switching a PTO switching solenoid valve 325. The PTO switching solenoid valve 325 is connected to the controller 3, and can turn "ON" and "OFF" the PTO clutch 320 through the operation on the PTO transmission lever or the PTO switch 165.

Figure 27:
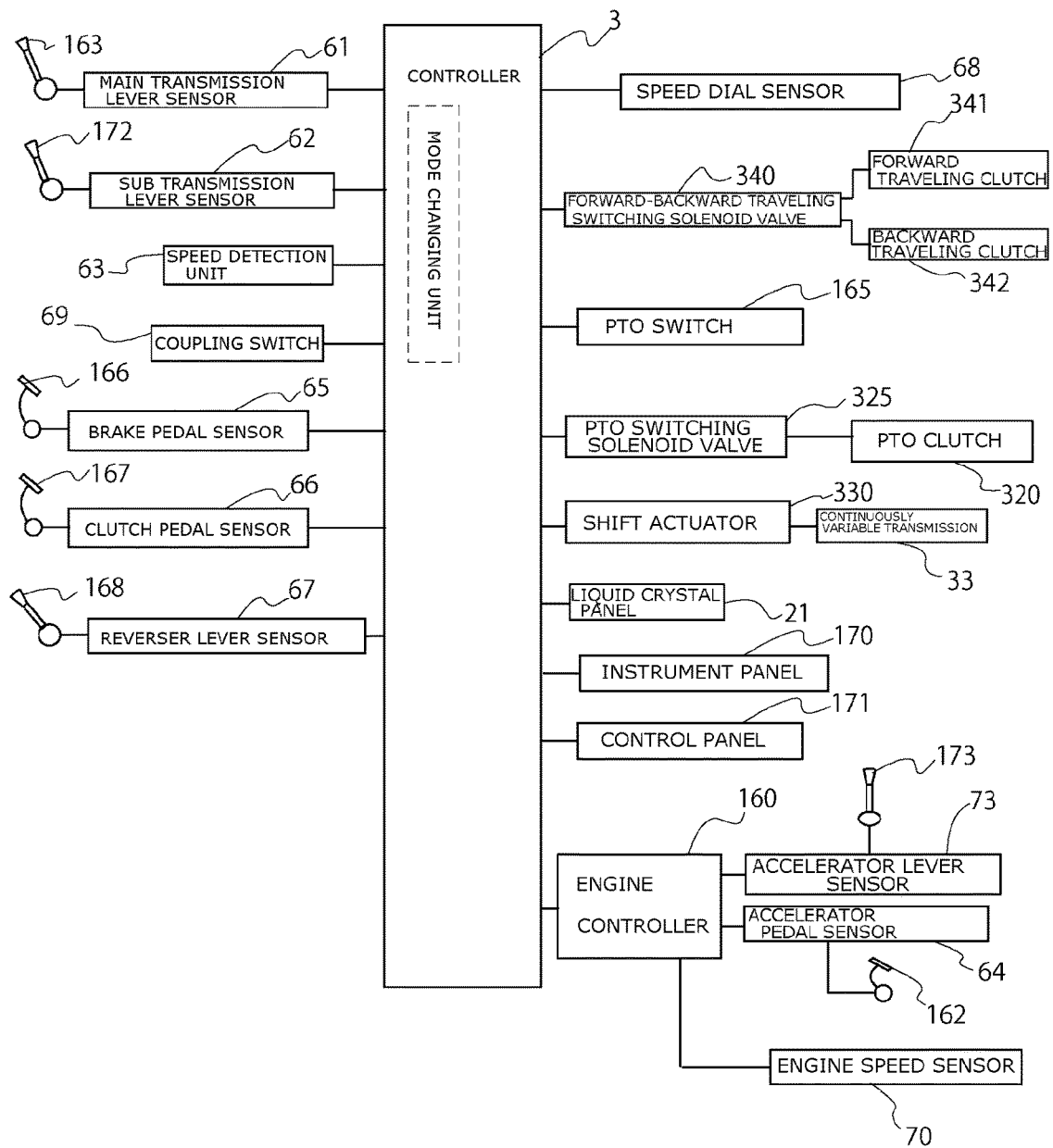
FIG. 27 is a control block diagram.
Figure 28:
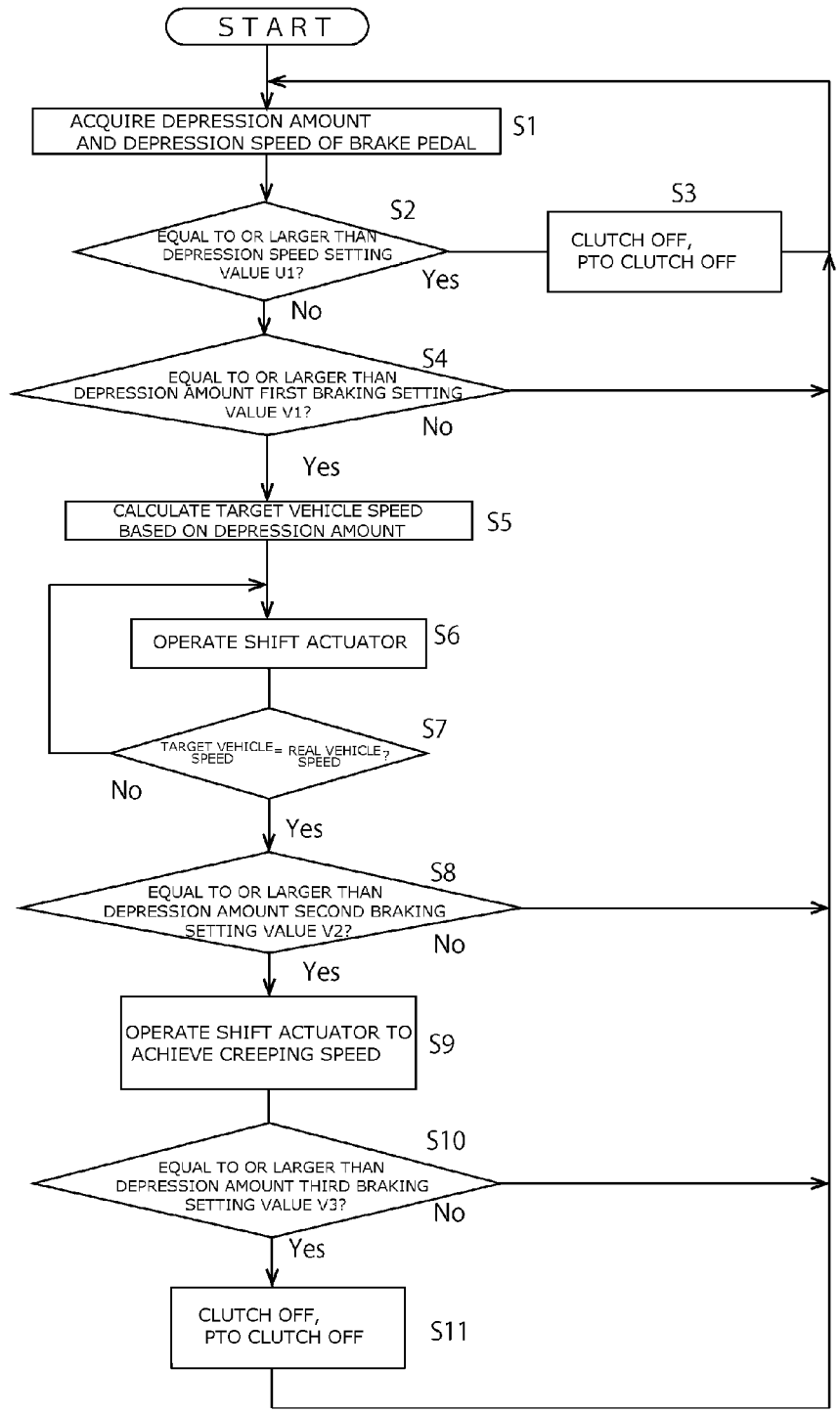
FIG. 28 is a control flowchart.
Figure 29:
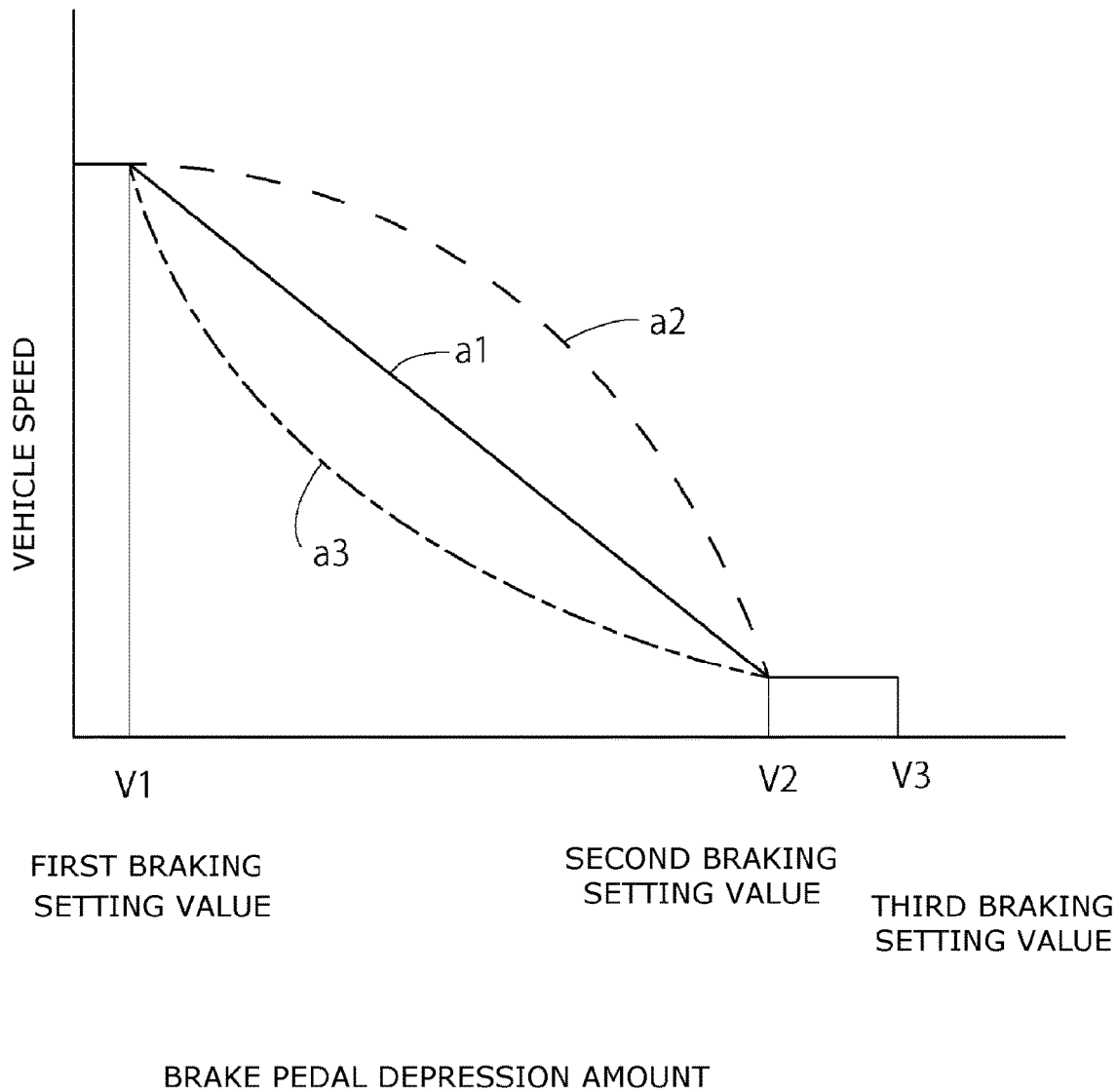
FIG. 29 is a diagram illustrating a relation between a depression amount of a brake pedal and deceleration.
Figure 30:
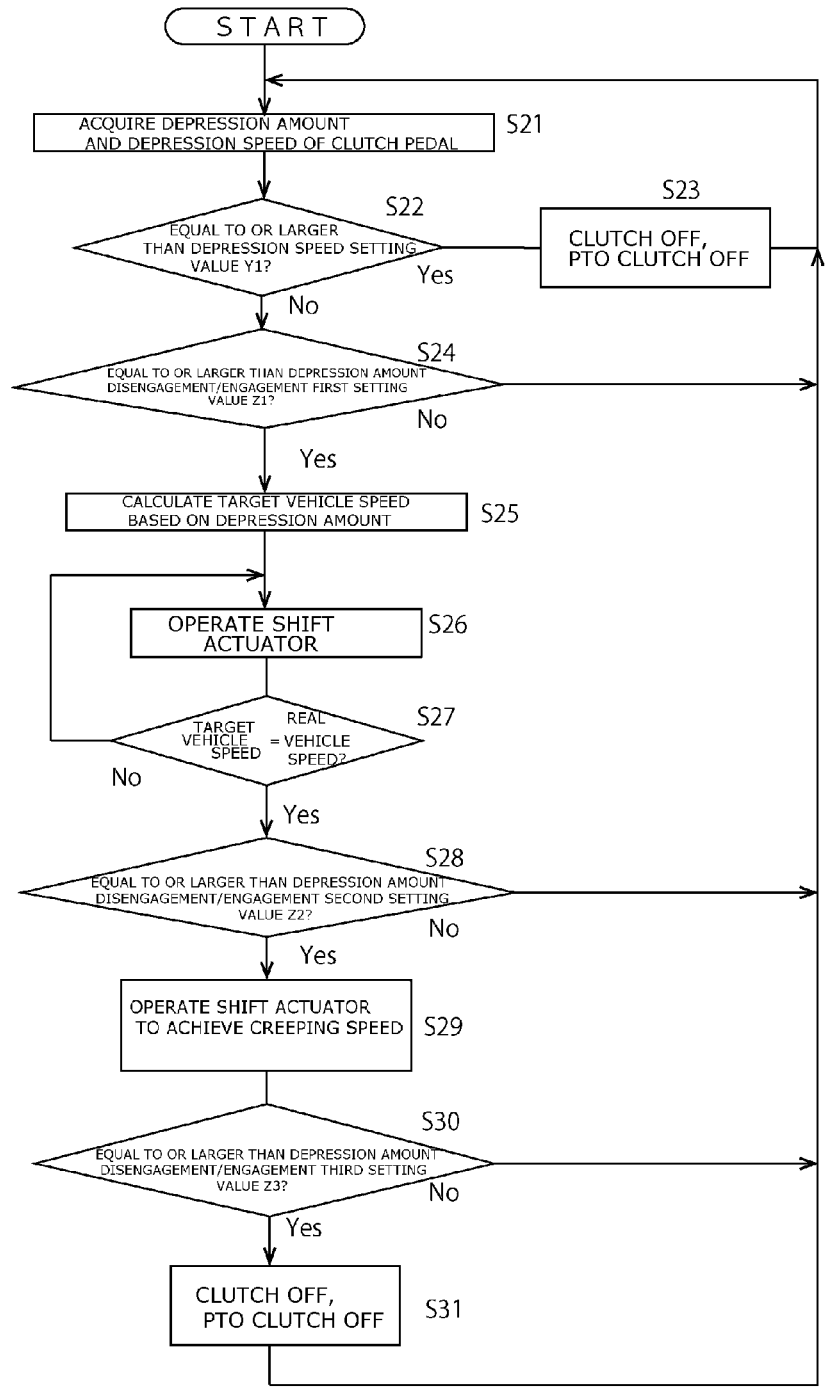
FIG. 30 is a control flowchart.
Figure 31:
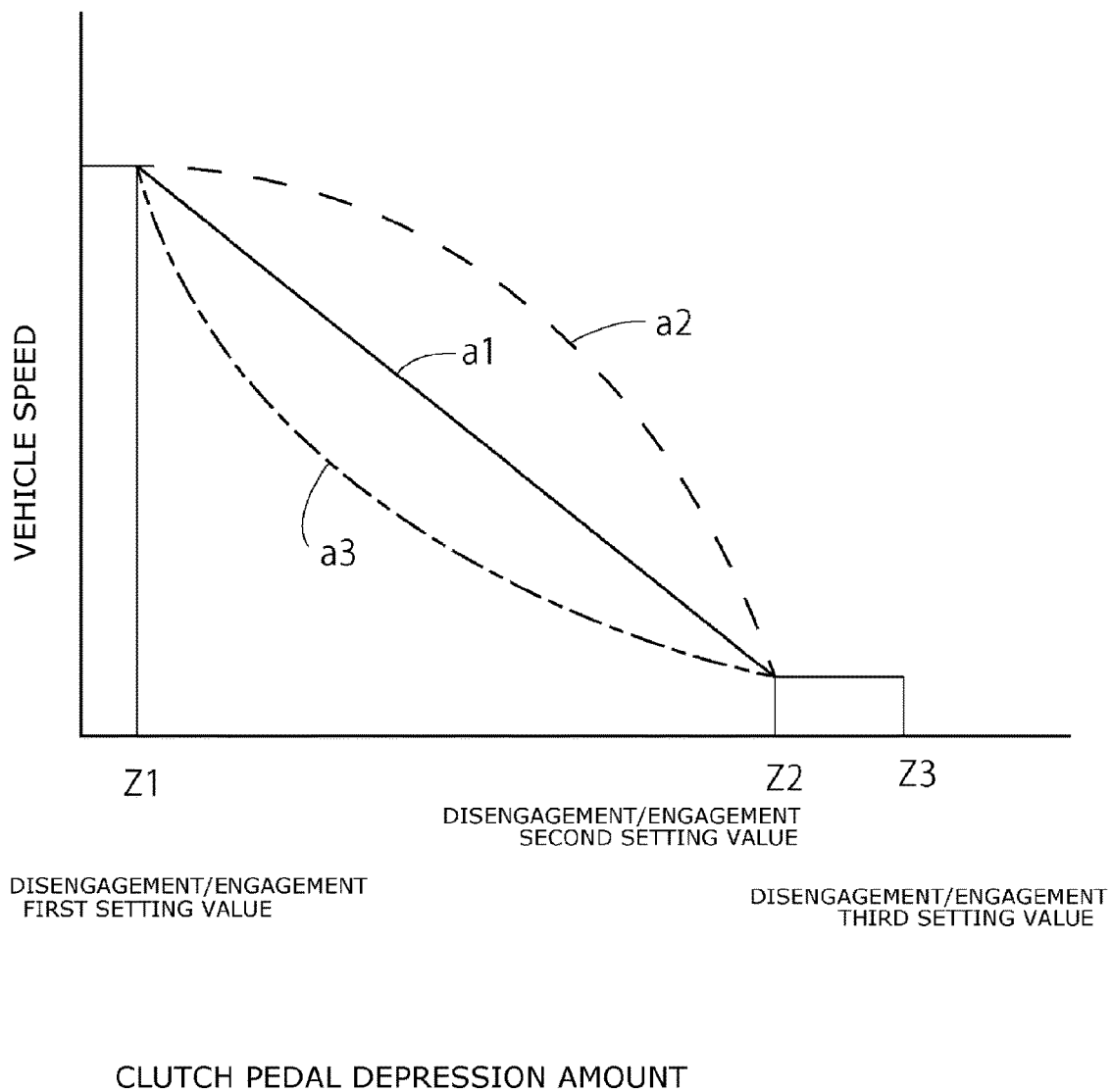
FIG. 31 is a diagram illustrating a relation between a depression amount of a clutch pedal and vehicle speed.

FIG. 27 is a control block diagram. FIG. 28 is a control flowchart, and FIG. 29 illustrates a relation between the depression amount of the brake pedal and deceleration. FIG. 30 is a control flowchart, and FIG. 31 illustrates a relation between the depression amount of the clutch pedal and vehicle speed.

As described above, the cabin 16 has the inner side serving as the operation control room in which the operator's seat 161, the accelerator pedal 162, the shift lever 163, and the like are arranged. The brake pedal 166, the clutch pedal 167, the reverser lever 168, the speed dial 169, the instrument panel 170, the control panel 171, the transmission lever 172, an acceleration lever 173, and the like are arranged in the periphery of the operator's seat 161. The operator can operate the accelerator pedal 162, the shift lever 163, and the like while being seated on the operator's seat 161 to operate the tractor 1.

The accelerator pedal 162 has a pivotal base portion provided with an accelerator pedal sensor 64 including an angular sensor that detects the depression amount (rotation angle) of the accelerator pedal 162. The accelerator lever 173 has a pivot base portion provided with an accelerator lever sensor 73 including an angular sensor that detects a rotation angle of the accelerator lever 173. Similarly, the brake pedal 166 and the clutch pedal 167 have pivot base portions respectively provided with a brake pedal sensor 65 and a clutch pedal sensor 66 each including an angular sensor that detects the depression amount. The reverser lever 168 and the speed dial 169 are respectively provided with a reverser sensor 67 and a speed dial sensor 68 that each detect a rotation amount.

The accelerator pedal sensor 64, the brake pedal sensor 65, the clutch pedal sensor 66, the reverser sensor 67, the speed dial sensor 68, and the accelerator lever sensor 73 are each connected to the controller 3. The left and right rear axles 15 and 15 are each provided with a braking device with which braking can be applied with a corresponding one of left and right brake pedals 166L and 166R. While the vehicle is traveling on the road, the left and right brake pedals 166L and 166R are coupled to each other that the braking can be simultaneously applied. The left and right pedals thus coupled can be detected by a coupling switch 69 and are connected to the controller 3. Thus, the brake pedal sensor 65 can detect the pivoting of the left and right brake pedals 166L and 166R coupled to each other (or simultaneously depressed). Alternatively, the brake pedal sensor 65 may be provided to each of the left and right sides.

The accelerator pedal 162 is configured to be interlocked with the shift actuator 330. Specifically, the control for achieving acceleration is performed by increasing the rotation speed of the engine 12 and operating the shift actuator 330 in accordance with the depression amount of the accelerator pedal 162. Thus, the traveling can be performed with shifting easily achieved without operating the transmission lever 172 or the accelerator lever 173.

Next, how the traveling speed is controlled based on the depression amount and the depression speed of the brake pedal 166 and the clutch pedal 167 is described. The controller 3 detects the depression speed by calculating the rate of change in the values detected by the brake pedal sensor 65 and the clutch pedal sensor 66. Alternatively, the depression speed may be detected by an angular velocity sensor provided to the brake pedal 166 and the accelerator pedal sensor 64, instead of being calculated by the controller 3.

How the traveling speed is controlled based on the depression amount of the brake pedal 166 is described. A storage device of the controller 3 stores a map indicating a relationship between the depression amount of the brake pedal 166 and the vehicle speed. The target vehicle speed relative to the depression amount of the brake pedal 166 is corrected in accordance with the pivoted positions of the shift lever 163, the transmission lever 172, and the accelerator lever 173 (accelerator pedal 162). Specifically, a larger pivoting of the shift lever 163, the transmission lever 172, and the accelerator lever 173 (accelerator pedal 162) leads to a higher speed, and thus the deceleration is corrected to be more sensitive to the depression of the brake pedal 166. An adjustment unit may be provided that can appropriately change the relationship. Thus, the deceleration may be proportional to the depression amount of the brake pedal 166 as indicated by a line a1 in FIG. 29. The deceleration rate which is low at the start of the depressing may increase as the depression amount increases as indicated by a line a2. Furthermore, the deceleration rate which is high at the start of the depressing may decrease as the depression amount increases as indicated by a line a3. The vehicle speed is set to be higher in the forward traveling than in the backward traveling when the shift lever 163, the transmission lever 172, and the accelerator lever 173 (accelerator pedal 162) are at the same position, and the same applies to the deceleration.

Detailed description is given with reference to a control flowchart in FIG. 28.

When the vehicle is traveling on the road or for work, the controller 3 acquires the depression amount and the depression speed from the brake pedal sensor 65 (S1). When the depression speed is equal to or higher than a setting value U1 (S2), it is determined that heavy braking has been applied and the main clutch (the forward traveling clutch 341 and the backward traveling clutch 342 in the present embodiment) and the PTO clutch 320 are turned OFF (S3). Thus, the vehicle can make a sudden stop, with the main clutch and the PTO clutch 320 turned OFF without delay, without imposing a large load on the engine 12, the transmission 13, the work machine, or the like.

When the depression speed is equal to or lower than the setting value U1, whether the depression amount is equal to or larger than a first braking setting value V1 is determined (S4). The processing returns to step S1 when the depression amount is smaller than the first braking setting value V1. When the depression amount exceeds the first braking setting value V1, the vehicle speed is calculated based on the depression amount (S5). The shift actuator 330 of the continuously variable transmission 33 is operated, based on the calculated vehicle speed, to achieve the target vehicle speed (S6). The target vehicle speed is compared with the real vehicle speed detected by the speed detection unit 63 (S7). Then, control is performed in such a manner that the target vehicle speed matches the real vehicle speed. Thus, detailed speed control, as in the case of the operation with the half clutch, can be achieved without operating the transmission lever 172. The first braking setting value V1 is within the movable range of the brake pedal 166.

Whether the brake pedal 166 is further depressed so that the depression amount exceeds a second braking setting value V2 is determined (S8). The processing returns to step S1 when the value is not exceeded. When the second braking setting value V2 is exceeded, the shift actuator 330 of the continuously variable transmission 33 is operated to achieve creeping speed (S9). Whether the brake pedal 166 is further depressed so that the depression amount exceeds a third braking setting value V3 is determined (S10). The processing returns to step S1 when the value is not exceeded. When the third braking setting value V3 is exceeded, the main clutch and the PTO clutch 320 are turned OFF (S11). Thus, the vehicle can travel at the creeping speed when the depression position is close the maximum depression position. Thus, the work can be continued without stopping with the work machine pulled with a large torque. When the depression amount reaches the maximum amount and thus the travelling stops, the main clutch and the PTO clutch 320 are automatically turned OFF, to prevent a large load from being imposed on the engine 12, the transmission 13, the work machine, and the like.

Next, how the traveling speed is controlled based on the depression amount of the clutch pedal 167 is described. The storage device of the controller 3 stores a map indicating a relationship between the depression amount of the clutch pedal 167 and the vehicle speed. The target vehicle speed relative to the depression amount of the clutch pedal 167 is corrected in accordance with the pivoted positions of the shift lever 163, the transmission lever 172, and the accelerator lever 173 (accelerator pedal 162). Specifically, a larger pivoting of the shift lever 163, the transmission lever 172, and the accelerator lever 173 (accelerator pedal 162) leads to a higher speed, and thus the deceleration is corrected to be more sensitive to the depression of the clutch pedal 167. An adjustment unit may be provided that can appropriately change the relationship. Thus, the deceleration may be proportional to the depression amount of the clutch pedal 167 as indicated by a line a1 in FIG. 31. The deceleration rate which is low at the start of the depressing may increase as the depression amount increases as indicated by a line a2. Furthermore, the deceleration rate which is high at the start of the depressing may decrease as the depression amount increases as indicated by a line a3. The vehicle speed is set to be higher in the forward traveling than in the backward traveling when the shift lever 163, the transmission lever 172, and the accelerator lever 173 (accelerator pedal 162) are at the same position, and the same applies to the deceleration.

Detailed description is given with reference to a control flowchart in FIG. 30.

When the vehicle is traveling on the road or for work, the controller 3 acquires the depression amount and the depression speed from the clutch pedal sensor 66 (S21). When the depression speed is equal to or higher than a setting value Y1 (S22), it is expected that the engine 12 is started or the sub transmission is switched. Thus, the main clutch (the forward traveling clutch 341 and the backward traveling clutch 342 in the present embodiment) and the PTO clutch 320 are turned OFF (S23). Thus, the engine 12 can be smoothly started and the sub transmission can be smoothly operated.

When the depression speed is equal to or lower than the setting value Y1, whether the depression amount is equal to or larger than a disengagement/engagement first setting value Z1 is determined (S24). The processing returns to step S21, when the disengagement/engagement first setting value Z1 is not exceeded. When the disengagement/engagement first setting value Z1 is exceeded, the vehicle speed is calculated based on the depression amount (S25). The shift actuator 330 of the continuously variable transmission 33 is operated, based on the calculated vehicle speed, to achieve the target vehicle speed (S26). The target vehicle speed is compared with the real vehicle speed detected by the speed detection unit 63 (S27). Then, control is performed in such a manner that the target vehicle speed matches the real vehicle speed. Thus, detailed speed control, as in the case of the operation with the half clutch, can be achieved without operating the transmission lever 172. The disengagement/engagement first setting value Z1 is within the movable range of the clutch pedal 167.

Whether the clutch pedal 167 is further depressed so that the depression amount exceeds a disengagement/engagement second setting value Z2 is determined (S28). The processing returns to step S21 when the value is not exceeded. When the disengagement/engagement second setting value Z2 is exceeded, the shift actuator 330 of the continuously variable transmission 33 is operated to achieve creeping speed (S29). Whether the clutch pedal 167 is further depressed so that the depression amount exceeds a disengagement/engagement third setting value Z3 is determined (S30). The processing returns to step S21 when the value is not exceeded. When the disengagement/engagement third setting value Z3 is exceeded, the main clutch and the PTO clutch 320 are turned OFF (S31). Thus, the vehicle can travel at the creeping speed when the depression position is close the maximum depression position. Thus, the work can be continued without stopping with the work machine pulled with a large torque. When the depression amount reaches the maximum amount and thus the travelling stops, the main clutch and the PTO clutch 320 are automatically turned OFF, to prevent a large load from being imposed on the engine 12, the transmission 13, the work machine, and the like.

When both the brake pedal 166 and the clutch pedal 167 are simultaneously operated, the operation of the brake pedal 166 is prioritized so that the emergency stop can be performed.

As described above, the vehicle includes: the engine 12; the continuously variable transmission 33 with which the rotational driving force from the engine 12 is shifted and transmitted to the traveling unit; the brake pedal 166 with which the breaking device provided to the traveling unit is operated; the brake pedal sensor 65 as the depression amount detection unit that detects the depression amount of the brake pedal 166; the clutch pedal 167 with which the main clutch is operated for connecting and disconnecting the power in the middle of the power transmission path between the engine 12 and the traveling unit; the clutch pedal sensor 66 as the depression amount detection unit that detects the depression amount of the clutch pedal 167; and the controller 3 that performs deceleration with the continuously variable transmission 33 in accordance with the depression amount of the brake pedal 166 or the clutch pedal 167. Thus, the speed control can be performed as in the case of the half clutch. Specifically, the operator who is used to the automatic transmission of the automobile can use the brake pedal 166, and the operator who is used to the manual transmission can use the clutch pedal 167 to perform the speed control as in the case of the half clutch. All things considered, the speed can be controlled in detail easily with a simple operation.

When the value detected by the depression amount detection unit for the brake pedal 166 or the clutch pedal 167 exceeds the first braking setting value V1 or Z1, the controller 3 causes shifting of the continuously variable transmission 33 to achieve the vehicle speed corresponding to the depression amount. When the amount is larger than the second braking setting value and is smaller than that of the maximum depression position, the vehicle travels at the creeping speed. Thus, the vehicle speed can be adjusted to a desired speed in accordance with the depression amount of the pedal. Thus, when the operated position is close to that for stopping the vehicle, the transmission lever 172 needs not to be operated to achieve shifting for achieving the creeping speed. Thus, the speed adjustment can be easily performed.

When both the brake pedal 166 and the clutch pedal 167 are operated, the controller 3 prioritizes the operation of the brake pedal 166. Thus, when sudden braking is applied, the braking for emergency stop can be applied, whereby safety can be guaranteed.

INDUSTRIAL APPLICABILITY

The present invention is applicable to techniques for work vehicles.

REFERENCE SIGNS LIST

1 tractor (work vehicle)
11 frame
12 engine
13 transmission
14 front axle
15 rear axle
16 cabin
2 display
21 liquid crystal panel
22 encoder dial
23 enter button
24 command button
25 command button
26 command button
27 command button
28 command button
33 continuously variable transmission
161 operator's seat
162 accelerator pedal
163 shift lever
S6 travel customization screen
Sd1 select switch
Sd2 select switch
Dd dialog box

The invention claimed is:
1. A work vehicle comprising:
an engine;
a continuously variable transmission configured to convert rotational driving force from the engine, the continuously variable transmission having an operation state changeable for changing a speed of the work vehicle starting and travelling; and
an operation control device comprising a brake operation device; and wherein:
an acceleration characteristic is adjustable for a case where the work vehicle starts traveling or a traveling speed is changed by operating the operation control device; and
the acceleration characteristic is adjustable for a case where the work vehicle is started by operating the brake operation device.

2. The work vehicle according to claim 1, wherein:
the operation control device further comprises a clutch operation device; and
the acceleration characteristic is also adjustable for a case where the work vehicle is started traveling by operating the clutch operation device.

3. The work vehicle according to claim 1, wherein:
the operation control device further comprises a forward-backward traveling switching operation device, and
the acceleration characteristic is also adjustable for a case where the work vehicle is started traveling by operating the forward-backward traveling switching operation device.

4. The work vehicle according to claim 1, wherein:
the operation control device further comprises a shift operation device, and
the acceleration characteristic is also adjustable for a case where the work vehicle is started traveling by operating the shift operation device.

5. The work vehicle according to claim 1, wherein:
the operation control device further comprises a shift operation device; and
the acceleration characteristic is also adjustable for a case where the traveling speed is changed by operating the shift operation device.

6. The work vehicle according to claim 1, further comprising:
a display disposed near a seat for an operator; and
wherein the display is capable of displaying a screen for adjusting the acceleration characteristic.

7. The work vehicle according to claim 6, wherein:
the operation control device includes a shift operation device; and
the display is capable of displaying a screen for adjusting the acceleration characteristic for each operated position of the shift operation device.

8. The work vehicle according to claim 6, wherein the display is capable of displaying a slide bar slidable toward one end side for achieving a slower acceleration characteristic and toward another end side for achieving a quicker acceleration characteristic.

9. The work vehicle according to claim 1, further comprising:
an accelerator pedal with which an operational state of the engine is changeable;
wherein in the work vehicle capable of traveling with an operator operating the accelerator pedal, a display is disposed near a seat of an operator; and
wherein the display is capable of displaying a screen for selecting whether accelerator interlocked traveling is allowed.

10. The work vehicle according to claim 9, further comprising:
a transmission; and
a shift lever with which an operation state of the transmission is changeable,
wherein the display is capable of displaying the screen for selecting whether the accelerator interlocked traveling is allowed for each operated position of the shift lever.

11. The work vehicle according to claim 9, wherein switching for selecting not to allow the accelerator interlocked traveling is not able to be performed on the display while the work vehicle is traveling.

12. The work vehicle according to claim 1, further comprising:
a brake pedal with which a braking device provided to a traveling unit is operated;
a depression amount detection unit configured to detect a depression amount of the brake pedal;
a main clutch pedal with which a main clutch is operated for connecting and disconnecting power in a middle of a power transmission path between the engine and the traveling unit;
a depression amount detection unit configured to detect a depression amount of the main clutch pedal; and
a controller configured to perform deceleration with the continuously variable transmission in accordance with the depression amount of the brake pedal or the main clutch pedal.

13. The work vehicle according to claim 12, wherein the controller is configured to perform, when a value detected by the depression amount detection unit for the brake pedal or the main clutch pedal exceeds a first setting value, speed change with the continuously variable transmission for achieving a vehicle speed corresponding to the depression amount, and to make the work vehicle travel at a creeping speed when the value is larger than a second setting value and smaller than a value at a maximum depression position.

14. The work vehicle according to claim 12, wherein the controller is configured to prioritize, when an accelerator pedal and an accelerator lever are both operated, an operation on the brake pedal.

15. A work vehicle comprising:
an engine;
a continuously variable transmission configured to convert rotational driving force from the engine, the continuously variable transmission having an operation state changeable for changing a speed of the work vehicle starting and travelling;
an operation control device, wherein an acceleration characteristic is adjustable for a case where the work vehicle starts or a traveling speed is changed by operating the operation control device;
an accelerator pedal with which an operational state of the engine is changeable, the work vehicle capable of traveling based on operation of the accelerator pedal; and
a display is disposed near a seat of an operator and capable of displaying a screen for selecting whether accelerator interlocked traveling is allowed.

16. The work vehicle according to claim 15, further comprising:
a transmission; and
a shift lever with which an operation state of the transmission is changeable; and
wherein the display is further capable of displaying the screen for selecting whether the accelerator interlocked traveling is allowed for each operated position of the shift lever.

17. The work vehicle according to claim 15, wherein switching for selecting not to allow the accelerator interlocked traveling is not able to be performed on the display while the work vehicle is traveling.

18. A work vehicle comprising:

an engine;

a continuously variable transmission configured to convert rotational driving force from the engine, the continuously variable transmission having an operation state changeable for changing a speed of the work vehicle starting and travelling;

an operation control device, wherein an acceleration characteristic is adjustable for a case where the work vehicle starts or a traveling speed is changed by operating the operation control device;

a brake pedal with which a braking device provided to a traveling unit is operated;

a depression amount detection unit configured to detect a depression amount of the brake pedal;

a main clutch pedal with which a main clutch is operated for connecting and disconnecting power in a middle of a power transmission path between the engine and the traveling unit;

a depression amount detection unit configured to detect a depression amount of the main clutch pedal; and a controller configured to perform deceleration with the continuously variable transmission in accordance with the depression amount of the brake pedal or the main clutch pedal.

19. The work vehicle according to claim 18, wherein the controller is configured to perform, when a value detected by the depression amount detection unit for the brake pedal or the main clutch pedal exceeds a first setting value, speed change with the continuously variable transmission for achieving a vehicle speed corresponding to the depression amount, and to make the work vehicle travel at a creeping speed when the value is larger than a second setting value and smaller than a value at a maximum depression position.

20. The work vehicle according to claim 18, wherein the controller is configured to prioritize, when an accelerator pedal and an accelerator lever are both operated, an operation on the brake pedal.

* * * * *